(12) United States Patent
Onaizi

(10) Patent No.: US 12,268,984 B1
(45) Date of Patent: Apr. 8, 2025

(54) PROCESS FOR REMOVING HYDROGEN SULFIDE FROM SOUR GASES WITH ZIF-8 MIXED METAL HYDROXIDES COMPOSITES

(71) Applicant: KING FAHD UNIVERSITY OF PETROLEUM AND MINERALS, Dhahran (SA)

(72) Inventor: Sagheer A. Onaizi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/772,460

(22) Filed: Jul. 15, 2024

(51) Int. Cl.
*B01D 53/10* (2006.01)
*B01J 20/22* (2006.01)

(52) U.S. Cl.
CPC ............ *B01D 53/10* (2013.01); *B01J 20/226* (2013.01); *B01D 2253/204* (2013.01); *B01D 2257/304* (2013.01)

(58) Field of Classification Search
None
See application file for complete search history.

(56) References Cited

U.S. PATENT DOCUMENTS

| | | |
|---|---|---|
| 2014/0294719 A1 | 10/2014 | Schreiner |
| 2014/0348736 A1 | 11/2014 | Othman et al. |
| 2024/0082809 A1 | 3/2024 | Onaizi |
| 2024/0093107 A1 | 3/2024 | Onaizi |

FOREIGN PATENT DOCUMENTS

| | | | |
|---|---|---|---|
| CA | 2953591 | A1 * | 7/2018 |
| CN | 103464107 | A | 12/2013 |
| JP | 2022148458 | * | 10/2022 |
| WO | WO-2009130251 | A2 * | 10/2009 |
| WO | 2021001727 | * | 1/2021 |
| WO | WO-2021001727 | A1 * | 1/2021 |

OTHER PUBLICATIONS

Kiran Raj G. Burra, et al., "Catalytic transformation of H2S for H2 production", International Journal of Hydrogen Energy, vol. 43, Issue 51, Dec. 20, 2018, pp. 22852-22860.

Abolfazl Atash Jameh, et al., "Synthesis and modification of Zeolitic Imidazolate Framework (ZIF-8) nanoparticles as highly efficient adsorbent for H2S and CO2 removal from natural gas", Journal of Environmental Chemical Engineering vol. 7, Issue 3, Jun. 2019, 103058.

\* cited by examiner

*Primary Examiner* — Sheng H Davis
(74) *Attorney, Agent, or Firm* — Oblon, McClelland, Maier & Neustadt, L.L.P.

(57) ABSTRACT

A method for removing hydrogen sulfide ($H_2S$) from a $H_2S$-containing gas composition, including charging an aqueous media to a reactor under continuous agitation, dispersing particles of a composite in the aqueous media to form a composite mixture, continuously agitating the composite mixture, introducing the $H_2S$-containing gas composition to the reactor containing the composite mixture under continuous agitation and passing the $H_2S$-containing gas composition through the composite mixture, and adsorbing and removing $H_2S$ from the gas composition by the composite mixture to form a purified gas composition. The composite contains a XMgAl mixed hydroxide, where X is Zn, Co, Mn, or Cu, and a zeolitic imidazolate framework-8 (ZIF-8). Particles of the XMgAl mixed hydroxide are dispersed within pores of the ZIF-8.

16 Claims, 14 Drawing Sheets

PROCESS FOR REMOVING HYDROGEN SULFIDE FROM SOUR GASES WITH ZIF-8 MIXED METAL HYDROXIDES COMPOSITES

STATEMENT OF ACKNOWLEDGEMENT

Support provided by the King Fahd University of Petroleum and Minerals (KFUPM) is gratefully acknowledged.

BACKGROUND

Technical Field

The present disclosure is directed to a process for removing hydrogen sulfide ($H_2S$) from a $H_2S$-containing fluid, and particularly, to the process for removing $H_2S$ from a gaseous composition with a mixed metal hydroxide and ZIF-8 composite.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention. Hydrogen sulfide is a colorless, odiferous, and highly toxic gas that can cause possible life-threatening situations at a concentration as low as 350 ppm for a short-term exposure. In addition to its toxicity, health and safety issues, this colorless gas is also highly corrosive and hence it is desirable and often necessary to remove hydrogen sulfide from a hydrogen sulfide containing stream, such as sour natural gas, biogas, and sour gases.

Accordingly, the maximum concentration of $H_2S$ in marketable natural gas is 4 ppmv at standard temperature and pressure, which is considered to be the threshold value above which the natural gas needs to be sweetened in order to reduce the $H_2S$ concentration. Localized corrosion and stress cracking is common in pipes/units handling $H_2S$-containing streams. It has been reported that the presence of $H_2S$ even at low concentrations can cause a substantial adverse impact on carbon steel. Therefore, $H_2S$ must be effectively scavenged from sour gases to not only mitigate its safety and operational issues but also reduce its damage to the pipelines, valves and surfaces of process equipment.

Technologies and approaches to these problems have been developed industrially for sweetening (e.g., removing $H_2S$) hydrocarbons and natural gas. These technologies mainly involve the use of amine-based solutions, carbonaceous materials, or metal salts as adsorbents of $H_2S$, or as oxidizers for converting $H_2S$ to more harmless element sulfur. Practical approaches often involve (i) complicated homogenous systems, (ii) sophisticated chemical agents, e.g., highly functionalized chelating agents, flammable oxidizing agents and costly stabilizers, and (iii) restricted application conditions, e.g., limited pH ranges, particular temperature ranges, and certain pressure requirements. Hence, there is a need for improved desulfurization and/or sweetening techniques, and apparatuses and protocols for such treatment.

In view of the forgoing, one objective of the present disclosure is to provide a process for removing $H_2S$ from a $H_2S$-containing gas composition. A further objective of the present disclosure is to provide a mixed metal hydroxide and ZIF-8 composite and the application in a continuous stirred tank process for the desulfurization of sour gases and liquid hydrocarbon fuels.

SUMMARY

In an exemplary embodiment, a process for removing hydrogen sulfide ($H_2S$) from a $H_2S$-containing gas composition is described. The process for removing $H_2S$ from the $H_2S$-containing gas composition includes charging an aqueous media to a reactor under continuous agitation. The process also includes dispersing particles of a composite in the aqueous media to form a composite mixture. The process further includes continuously agitating the composite mixture. In addition, the process involves introducing the $H_2S$-containing gas composition to the reactor containing the composite mixture under continuous agitation and passing the $H_2S$-containing gas composition through the composite mixture. Furthermore, the process also includes adsorbing the $H_2S$ from the $H_2S$-containing gas composition onto the composite to remove the $H_2S$ from the $H_2S$-containing gas composition and form a purified gas composition. The composite includes a XMgAl mixed hydroxide, where X is Zn, Co, Mn, or Cu, and a zeolitic imidazolate framework-8 (ZIF-8). Particles of the XMgAl mixed hydroxide are dispersed within pores of the ZIF-8. The composite is made by a method including preparing the ZIF-8 and hydrothermally reacting the ZIF-8 with metal salts of metals in the XMgAl mixed hydroxide to form the composite.

In some embodiments, the XMgAl mixed hydroxide has a molar ratio of X to Mg to Al of 1-10 to 1-10 to 1-10.

In some embodiments, the XMgAl mixed hydroxide has a molar ratio of X to Mg to Al of 10 to 1 to 3.67.

In some embodiments, the composite comprises 30-70 wt. % of the XMgAl mixed hydroxide and 30-70 wt. % of the ZIF-8, based on a total weight of the composite.

In some embodiments, particles of the ZIF-8 have an average size of 0.1-10 µm.

In some embodiments, the ZIF-8 has a Langmuir specific surface area of 1300-1700 $m^2/g$, and a BET specific surface area of 1100-1300 $m^2/g$.

In some embodiments, the ZIF-8 has a specific pore volume of 0.3-0.7 $m^3/g$, and a pore size of 0.5-5 nm.

In some embodiments, the particles of the XMgAl mixed hydroxide are further dispersed on a surface of the ZIF-8.

In some embodiments, the composite has a Langmuir specific surface area of 20-60 $m^2/g$.

In some embodiments, the composite has a BET specific surface area of 10-45 $m^2/g$.

In some embodiments, the composite has a specific pore volume of 0.01-0.5 $m^3/g$.

In some embodiments, the composite has a pore size of 5-25 nm.

In some embodiments, the gas composition further contains at least one of methane, carbon dioxide, and nitrogen, and the composite selectively adsorbs the $H_2S$.

In some embodiments, the $H_2S$ is present in the gas composition at a concentration in a range of 10 to 200 parts per million by volume (ppmv) based on a total volume of the gas composition.

In some embodiments, the $H_2S$-containing gas composition is introduced to the reactor at a rate of 0.4 to 2.0 milliliters per minute (mL/min) per milligram of the composite.

In some embodiments, the composite is present in the liquid at a concentration in a range of from 0.5 to 2 milligrams per milliliter (mg/mL).

In some embodiments, the XMgAl mixed hydroxide is a CuMgAl mixed hydroxide.

In some embodiments, the composite is present in the aqueous media at a concentration of 1 mg/mL, the composite is in contact with the gas composition comprising 100 ppmv of $H_2S$ at a rate of 80 mL/min in the stirred tank reactor, and wherein the composite has a breakthrough time of from 15-20 hours, and a saturation time of from 18-22 hours.

In some embodiments, the composite has a scavenging capacity of 100-150 mg of hydrogen sulfide per gram of composite in the reactor.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
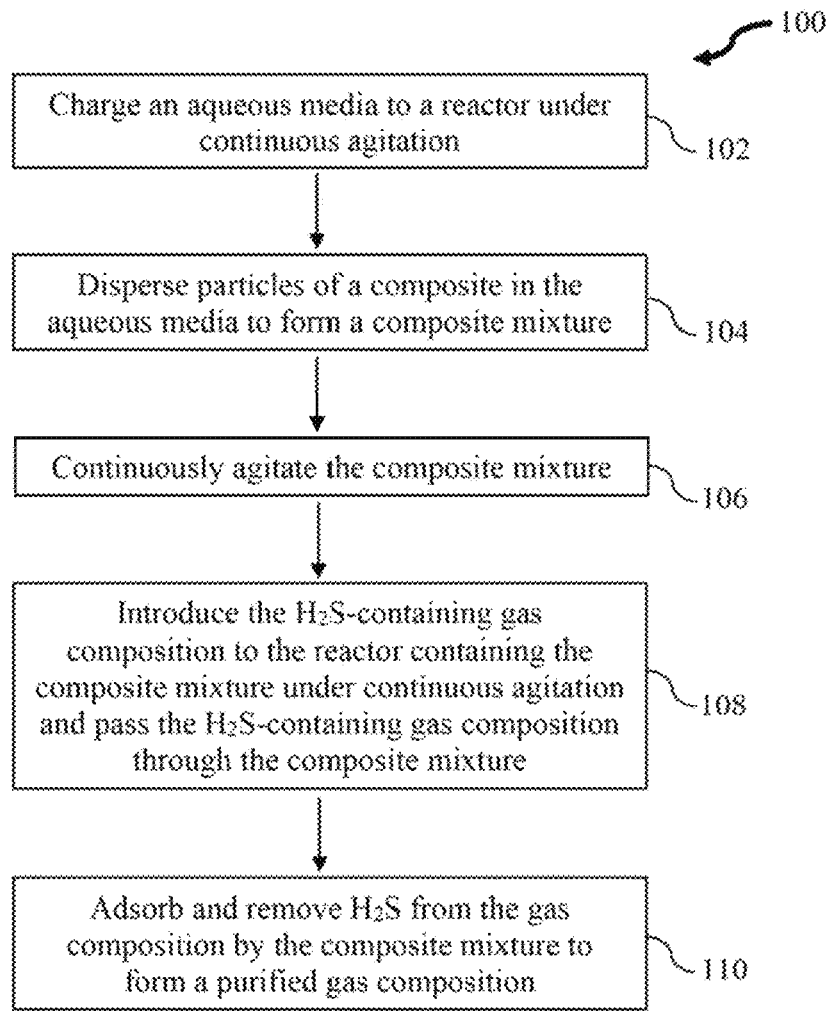
FIG. 1 is a schematic flow diagram of a process for removing hydrogen sulfide ($H_2S$) from a $H_2S$-containing gas composition, according to certain embodiments.

In the following description, it is understood that other embodiments may be utilized, and structural and operational changes may be made without departure from the scope of the present embodiments disclosed herein.

Embodiments of the present disclosure will now be described more fully hereinafter with reference to the accompanying drawings, in which some, but not all embodiments of the disclosure are shown. In the drawings, like reference numerals designate identical or corresponding parts throughout the several views.

Furthermore, the terms "approximately," "approximate," "about," and similar terms generally refer to ranges that include the identified value within a margin of 20%, 10%, or preferably 5%, and any values there between.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g., 0 wt. %).

As used herein, the term "fluid" refers to a gas, a liquid, a mixture of gas and liquid, or a gas or liquid comprising dispersed solids, droplets and/or bubbles. The droplets and/or bubbles may be irregular or regular and may be similar or different in size.

As used herein, the term "stirred tank reactor," "continuous stirred tank reactor," "mixed flow reactor," "continuous flow stirred tank reactor," and similar terms generally refer to a model for a chemical reactor in chemical engineering. The stirred tank reactor may have a liquid height and a rotating shaft containing a plurality of agitator blades.

As used herein, the term "quenching" refers to the rapid reduction of the temperature of the reaction mixture, the rapid introduction of a reactant or non-reactant fluid into the reaction mixture, or the reaction through a restricted opening or passage having dimensions below the quench diameter. In accordance with the present invention disclosure, the term "quenching" also refers to the process of terminating a chemical reaction with an associated reduction of temperature.

As used herein, the term "hydrocarbon" refers to hydrocarbon compounds, i.e., aliphatic compounds (e.g., alkanes, alkenes or alkynes), alicyclic compounds (e.g., cycloalkanes, cycloalkylenes), aromatic compounds, aliphatic and alicyclic substituted. It may refer to aromatic compounds, aromatic substituted aliphatic compounds, aromatic substituted alicyclic compounds and similar compounds. The term "hydrocarbon" may also refer to a substituted hydrocarbon compound, e.g., a hydrocarbon compound containing non-hydrocarbon substituents. Examples of non-hydrocarbon substituents may include hydroxyl, acyl, nitro and the like. The term "hydrocarbon" may as well refer to a hetero-substituted hydrocarbon compound, i.e., a hydrocarbon compound which comprises an atom other than carbon in the chain or ring and the other part comprises a carbon atom. Heteroatoms may include, for example, nitrogen, oxygen, sulfur and similar elements.

The present disclosure describes a process for $H_2S$ scavenging from sour gases and liquids in a continuous stirred tank reactor to meet the growing needs of desulfurization on an industrial scale. The process optionally involves making and using a composite to react with the $H_2S$ in a heterogeneous mixture. The effectiveness of the said process and composite was assessed by injecting a sour natural gas into a stirred tank reactor containing the composite dispersed in a liquid. The gas leaving the stirred tank reactor was continuously monitored and the concentration of $H_2S$ in the sweetened gas was continuously measured, enabling the construction of $H_2S$ breakthrough curves and the calculation of the amount of $H_2S$ scavenged.

According to an aspect, the present disclosure relates to a process for removing hydrogen sulfide ($H_2S$) from a $H_2S$-containing gas composition. The process for removing $H_2S$ from a $H_2S$-containing gas composition involves (i) charging an aqueous media to a reactor optionally under continuous agitation, (ii) dispersing particles of a composite in the aqueous media to form a composite mixture, (iii) continuously agitating the composite mixture, (iv) introducing the $H_2S$-containing gas composition to the reactor containing the composite mixture under continuous agitation and passing the $H_2S$-containing gas composition through the composite mixture, and (v) adsorbing the $H_2S$ from the $H_2S$-containing gas composition onto the composite to remove the $H_2S$ from the $H_2S$-containing gas composition and form a purified gas composition.

Referring to FIG. 1, a schematic flow diagram of a process for removing $H_2S$ from a $H_2S$-containing gas composition is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes charging a liquid to a reactor under continuous agitation. In one exemplary embodiment, the liquid includes an aqueous media, an oil, an oil-in-water emulsion, and/or a water-in-oil emulsion. In one embodiment, the liquid is a sour oil. In a preferred embodiment, the liquid is a sour water. In a more preferred embodiment, the liquid is selected from the group consisting of tap water, ground water, distilled water, deionized water, saltwater, hard water, fresh water, and wastewater. For purposes of this description, the term "saltwater" may include saltwater with a chloride ion content of between about 6000 ppm and saturation and is intended to encompass seawater and other types of saltwater including groundwater containing additional impurities typically found therein such as brackish water. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in tap water, ground water, saltwater, wastewater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In some embodiments, the liquid may further contain ethylene glycol, methanol, ethanol, propanol, isopropanol, n-butanol, ethyl acetate, pet ether, pentane, hexane(s), decalin, THF, dioxane, toluene, xylene(s), and/or o-dichlorobenzene. In some more other embodiments, the liquid may contain a minority fraction of, or even no, water.

In some preferred embodiments, the liquid comprises at least 50, 60, 70, 75, 80, 85, 90, 95, 96, 97, 97.5, 98, 99, 99.1, 99.5, or 99.9 wt. % $H_2O$, based upon a total weight of the liquid.

In a further exemplary embodiment, the reactor is at least one reactor selected from the group consisting of a stirred tank reactor, a packed bed reactor, a slurry reactor, and a bubble column reactor. In some embodiments, the reactor is a stirred tank reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the liquid occupies at least $\frac{1}{20}$, $\frac{1}{10}$, $\frac{3}{10}$, $\frac{1}{2}$, $\frac{2}{3}$, $\frac{4}{5}$, or $\frac{9}{10}$ of the reactor volume. In some embodiments, the liquid occupies no more than $\frac{10}{11}$, $\frac{9}{10}$, $\frac{4}{5}$, $\frac{2}{3}$, $\frac{1}{2}$, $\frac{3}{10}$, or $\frac{1}{10}$ of the reactor volume. In some embodiments, means of stirring or agitation may include magnetic stirring via magnetic spin bar, impellers, and/or ultrasonic waves. In certain embodiments, stirring or agitation may speed up the removal of $H_2S$.

In some embodiments, the reactor may be a vertical cylindrical reactor. In some embodiments, the reactor has a plurality of inlets and outlets for fluids at the bottom of the reactor. In some further embodiments, the reactor has a plurality of inlets and outlets for fluids at the top of the reactor. In a preferred embodiment the reactor has a plurality of inlets and outlets for liquid-suspended solids at the bottom of the reactor. In some further preferred embodiments, the reactor has a plurality of inlets for solids at the top of the reactor.

In order to ensure that the solid and suspended materials in the composite mixture remain in suspension it is preferred that a series of recirculation tubes fluidly connect a lower portion of the vertical cylindrical reactor (preferably a bottom portion) with an upper portion or body portion of the vertical cylindrical reactor that contains the composite mixture and/or liquid materials present in the reactor. The recirculation tubes may fluidly connect to a conical bottom portion of the vertical cylindrical reactor representing the bottommost portion thereof. A plurality of recirculation routes is preferable. One or more pumping mechanisms functions to draw the composite mixture from the bottom portion of the vertical cylindrical reactor and reintroduce the composite mixture in suspended form at an upper portion of the body portion of the vertical cylindrical reactor, preferably at a point that is below the uppermost liquid line present inside the vertical cylindrical reactor. During operation one or more recirculation pumps having an upstream connection to an outlet at the bottom of the vertical cylindrical reactor and a downstream connection to the body portion of the vertical cylindrical reactor functions to keep the suspended materials in a suspended state thereby eliminating formation of a hardened plug of solid material at the bottom of the vertical cylindrical reactor. Preferably there are at least four recirculation tubes, one for each of four quadrants defining the cross-section of the vertical cylindrical reactor. The inlet points in the body portion of the vertical cylindrical reactor at which the composite mixture is returned to the vertical cylindrical reactor are preferably at a height of less than one half the total height of the body portion of the vertical cylindrical reactor preferably at a height of 0.3-0.45 of the total height of the body portion of the vertical cylindrical reactor, e.g., measured from the bottommost portion of the cylindrical shape to the topmost portion of the cylindrical shape not including and cone or extender. During operation both mechanical agitation by a propeller and mechanical agitation by the recirculation tubes may occur such that the solids materials inside composite mixture remain fully suspended without settling.

In some embodiments, the particles of the composite in the liquid may react with the $H_2S$ in the $H_2S$-containing gas composition optionally in the presence of a support to form a metal sulfide and a purified gas composition. In one embodiment, the $H_2S$-containing gas composition is sour gas. In another embodiment, the reactor may include a closed top. In a further embodiment, the sour gas is introduced to the reactor through a gas distributor located at a lower portion of a body portion of the reactor. In some embodiments, the particles of the composite are suspended in the liquid. In some further embodiments, the composite particles are retained in the liquid phase by a particle trap located at an upper portion of the body portion of the reactor. In another embodiment, the purified gas composition may be accumulated in an upper region of a reactor. In yet another embodiment, the accumulated purified gas composition may be vented from the reactor through the outlets at the top of the reactor to the gas analyzer. In a preferred embodiment, the metal sulfide may be accumulated and settled in the liquid to the lower portion of the body portion of the reactor. In a further preferred embodiment, the metal sulfide accumulated may be removed from the liquid through the outlets at the bottom of the reactor.

In some embodiments, the $H_2S$-containing gas composition may be passed into the composite mixture by a gas distributor within the body of the composite mixture to distribute the gas composition in the form of small bubbles adjacent to a lower end of the reactor. The procedure may be operated as a continuous process or in intermittent manner and is particularly useful for scavenging operations. In some further embodiments, the $H_2S$-containing gas composition may be heated to a suitable temperature before passing the composite mixture. The heated $H_2S$-containing gas composition is then in direct contact with the composite to convert substantially all $H_2S$ in the gas composition to metal sulfides.

In some embodiments, exhaustion of the capacity of the composite in the composite mixture to absorb and convert hydrogen sulfide to metal sulfides may be detected in any convenient manner and to form an exhausted reaction mixture containing metal sulfides. In some further preferred embodiments, the exhausted reaction mixture then is replenished with the composite mixture, or by the addition of the composite. Metal sulfides may be removed from the exhausted reaction mixture through the outlets at the bottom of the reactor.

At step 104, the method 100 includes dispersing particles of a composite in the liquid to form a composite mixture. In some embodiments, the composite includes a mixed hydroxide and a zeolitic imidazolate framework.

Layered hydroxides are a class of ionic solids characterized by a layered structure with the generic layer sequence $[AcBZAcB]_n$, where c represents layers of metal cations, A and B are layers of hydroxide ($HO^-$) anions, and Z are layers of other anions and neutral molecules (such as water). Lateral offsets between the layers may result in longer repeating periods. Layered hydroxides can be seen as derived from hydroxides of divalent cations with the brucite layer structure $[AdBAdB]_n$, by oxidation or cation replacement in the metal layers (d), so as to give them an excess positive electric charge; and intercalation of extra anion layers (Z) between the hydroxide layers (A,B) to neutralize that charge, resulting in the structure $[AcBZAcB]_n$. Layered hydroxides may be formed with a wide variety of anions in the intercalated layers (Z), such as dodecyl sulfate (DDS) ($CH_3(CH_2)_{11}OSO_3^-$), $Cl^-$, $Br^-$, nitrate ($NO_3^-$), carbonate ($CO_3^{2-}$), $SO_4^{2-}$, acetate ($C_2H_3O_2^-$), $SeO_4^{2-}$, and combinations thereof. The size and properties of the intercalated anions may have an effect on the spacing of the layers, known as the basal spacing.

A layered hydroxide may be a synthetic or a naturally occurring layered hydroxide. Naturally-occurring layered hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougerite group (fougerite, trbeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered hydroxide, such as coalingite, brugnatellite, or muskoxite.

In a preferred embodiment, the mixed hydroxide of the present disclosure is a layered hydroxide. In an alternative embodiment, the mixed hydroxide is a material including the metal hydroxides, but the particles are not layered on top of one another as in a layered hydroxide, but rather randomly dispersed.

In preferred embodiments, the layered hydroxide has a positive layer (c) which contains both divalent and trivalent cations. In an embodiment, the divalent ion is at least one selected from the group consisting of $M^{2+}$ is $Co^{2+}$, $Mg^{2+}$, $Mn^{2+}$, $Fe^{2+}$, $Cu^{2+}$, $Ni^{2+}$, $Cu^{2+}$, and $Zn^{2+}$. In an embodiment, the trivalent ion is at least one selected from the group consisting of $N^{3+}$ is $Al^{3+}$, $Mn^{3+}$, $Cr^{3+}$, $Fe^{3+}$, $Sc^{3+}$, $Ga^{3+}$, $La^{3+}$, $V^{3+}$, $Sb^{3+}$, $Y^{3+}$, $In^{3+}$, $Co^{3+}$ and/or $Ni^{3+}$. In a preferred embodiment, the layered hydroxide is a layered triple hydroxide (LTH) which contains two divalent cations and one trivalent cation. In an embodiment, the layered hydroxide is a layered triple hydroxide (LTH) which contains one divalent cation and two trivalent cations.

In an embodiment, the mixed hydroxide has a formula of XMgAl, where X is Zn, Co, Mn, or Cu, all of which are divalent. In an embodiment, the mixed hydroxide has a molar ratio of X to Mg to Al of 1-10 to 1-10 to 1-10, preferably a ratio of X is 1, 2, 3, 4, 5, 6, 7, 8, 9 or 10, a ratio of Mg is 1, 2, 3, 4, 5, 6, 7, 8, 9 or 10, and a ratio of Al is 1, 2, 3, 4, 5, 6, 7, 8, 9 or 10. In some embodiments, the XMgAl mixed hydroxide has a molar ratio of X to Mg to Al of 10 to 1 to 3.67. In a most preferred embodiment, the XMgAl is CuMgAl.

In an embodiment, the layered hydroxide component may have a particulate form, for example in the form of spheres, granules, whiskers, sheets, flakes, plates, foils, fibers, and the like. In some embodiments, the layered hydroxide includes particles having an average size of 1-50 nm, preferably 5-45 nm, preferably 10-40 nm, preferably 15-35 nm, preferably 20-30 nm, preferably 25 nm. In some embodiments, the layered hydroxide particles are in the form of plates, or nanoplatelets due to their small size. The nanoplatelets may be substantially round or oval shaped nanoplatelets or, alternatively, the nanoplatelets may be polygonal nanoplatelets, such as triangular, square, rectangular, pentagonal, hexagonal, star-shaped, and the like. In an embodiment, the layered hydroxide particles are in the form of hexagonal nanoplatelets with particle sizes stated above. Such nanoplatelets may have a thickness of less than 10 nm, preferably less than 8 nm, preferably less than 6 nm, preferably less than 4 nm. In an embodiment, the layered hydroxide has a basal spacing of 0.5 to 10 nm, preferably 1 to 9 nm, 2 to 8 nm, 3 to 7 nm, 4 to 6 nm or 4.5 to 5.5 nm. In some embodiments, the particles may not be layered but rather randomly dispersed, referred to as a mixed hydroxide.

In some embodiments, the layered hydroxide can be calcined to remove the water present between the layers, referred to as a layered oxide. The removal of the water creates voids between the layers. In some embodiments, the calcination is at a temperature of 300-500° C., 350-450° C., or about 400° C. for 2-8 hours, preferably 3-7 hours, 4-6 hours, or about 5 hours.

In an embodiment, the layered oxide component may have a particulate form, for example in the form of spheres, granules, whiskers, sheets, flakes, plates, foils, fibers, and the like. In some embodiments, the layered oxide includes particles having an average size of 10-70 nm, or preferably 15-65 nm, preferably 20-60 nm, preferably 25-55 nm, preferably 30-50 nm, preferably 35-45 nm. In some embodiments, the layered oxide particles are in the form of plates, or nanoplatelets due to their small size. The nanoplatelets may be substantially round or oval shaped nanoplatelets or, alternatively, the nanoplatelets may be polygonal nanoplatelets, such as triangular, square, rectangular, pentagonal, hexagonal, star-shaped, and the like. In an embodiment, the layered oxide particles are in the form of hexagonal nanoplatelets with particle sizes stated above. Such nanoplatelets may have a thickness of less than 10 nm, preferably less than 8 nm, preferably less than 6 nm, preferably less than 4 nm.

In some embodiments, the material included for adsorbing and removing $H_2S$ from the gas composition only includes a layered hydroxide or a layered oxide. In other words, these materials are not included in a composite but rather are present on their own for the treatment of the sour gas. In a preferred embodiment, the mixed hydroxide is supported on a porous material.

A metal organic framework (MOF) is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally a coordination polymer is a coordination compound with repeating coordination entities extending in one, two, or three dimensions. A coordination entity is an ion or neutral molecule that is composed of a central atom, usually that of a metal, to which is attached a surrounding array of atoms or groups of atoms, each of which is called ligands. More succinctly, a metal organic framework is characterized by metal ions or clusters coordinated to organic ligands to form one-, two-, or three-dimensional structures. Typically, a MOF exhibits a regular void or pore structure. The nature of the void or pore structure, including properties or structural factors such as the geometry about the metal ions or clusters, the arrangement of the linkages between metal ions or clusters, the number, identity, and spatial arrangement of voids or pores. These properties may be described as the structure of the repeat units and the nature of the arrangement of the repeat units. The specific structure of the MOF, which may include the void or pore structure is typically referred to as the MOF topology.

The metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In one or more embodiments, the metal ion is an ion of at least one metal selected from the group consisting of Zn, Cu, Fe, Ni, Co, Mn, Cr, Cd, Mg, Ca, and Zr.

In the formation of a metal organic framework, the organic ligands must meet certain requirements to form coordination bonds, primarily being multi-dentate, having at least two donor atoms (i.e., N—, and/or O—) and being neutral or anionic. The structure of the metal organic framework is also affected by the shape, length, and functional groups present in the organic linker. In certain embodiments, the metal organic framework of the present disclosure comprises anionic ligands as organic ligands. In one or more embodiments, the organic ligands may have at least two nitrogen donor atoms. For example, the organic ligands may be imidazolate-based, imidazole-derived or ligands similar to an imidazole including, but not limited to, optionally substituted imidazoles, optionally substituted benzimidazoles, optionally substituted imidazolines, optionally substituted pyrazoles, optionally substituted thiazoles, and optionally substituted triazoles. In a preferred embodiment, the metal organic framework of the present disclosure in any of its embodiments comprises 2-methylimidazole as the organic ligand. 2-Methylimidazole has free nitrogen atoms that may each form a coordinative bond to the metal ions (e.g., Zn(II)) to produce a coordination network.

In one or more embodiments, the ligand may be an imidazole of formula (I) or a benzimidazole of formula (II):

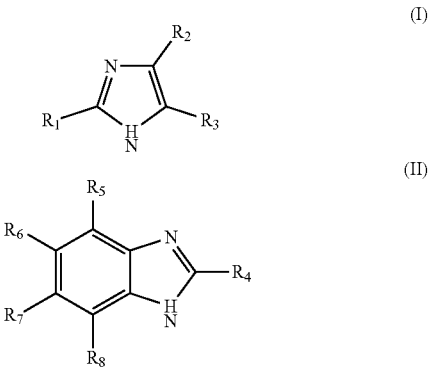

wherein $R_1$, $R_2$, $R_3$, $R_4$, $R_5$, $R_6$, $R_7$, and $R_8$ are each independently selected from the group consisting of a hydrogen, an optionally substituted alkyl, an optionally substituted cycloalkyl, an optionally substituted alkoxy, a hydroxyl, a halogen, a nitro, and a cyano. Preferably, $R_1$, $R_2$, $R_3$, $R_4$, $R_5$, $R_6$, $R_7$, and $R_8$ are each independently a hydrogen, an optionally substituted $C_1$-$C_3$ alkyl group, or an optionally substituted $C_3$-$C_6$ cycloalkyl group. More preferably, $R_1$, $R_2$, $R_3$, $R_4$, $R_5$, $R_6$, $R_7$, and $R_8$ are each independently a hydrogen or a methyl.

Exemplary imidazole-based ligands that may be applicable to the current disclosure include, but are not limited to, imidazole, 2-methylimidazole, 4-methylimidazole, 2-ethylimidazole, 2-isopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl) methanol, 4-(hydroxymethyl) imidazole, 2-aminoimidazole, 4-(trifluoromethyl)-1H-imidazole, 4-cyanoimidazole, 3H-imidazole-4-carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl) imidazole, 4,5-dicyanoimidazole, 4-imidazoleacetic acid, 4-methyl-5-imidazolemethanol, 1-(4-methyl-1H-imidazol-5-yl) methanamine, 4-imidazoleacrylic acid, 5-bromo-2-propyl-1H-imidazole, ethyl-(1H-imidazol-2-ylmethyl)-amine, and 2-butyl-5-hydroxymethylimidazole. In preferred embodiments, the imidazole of formula (I) is 2-methylimidazole.

Exemplary benzimidazole-based ligands that may be applicable to the current disclosure include, but are not limited to, benzimidazole, 5-methylbenzimidazole, 2-methylbenzimidazole, 5-chlorobenzimidazole, 5-bromobenzimidazole, 5,6-dimethylbenzimidazole, 5-methoxybenzimidazole, 2-chlorobenzimidazole, 2-bromo-1H-benzimidazole, 6-bromo-1H-benzimidazole, 5-fluoro-1H-benzimidazole, 5-chloro-2-methylbenzimidazole, methyl benzimidazole-2-acetate, 1H-benzoimidazol-4-ol, 1H-benzimidazol-5-ylmethanol, 2-benzimidazolemethanol, 4-chloro-6-(trifluoromethyl)benzimidazole, 5-chloro-2-(trichloromethyl) benzimidazole, 5-cyanobenzimidazole, (2-benzimidazolyl) acetonitrile, (5-chloro-1H-benzimidazol-2-yl) methanol, 2-(chloromethyl)benzimidazole, 5-iodo-2-methylbenzimidazole, (5-chloro-1H-benzimidazol-2-yl)methylamine, 2-(aminomethyl)benzimidazole, 2-(6-chloro-1H-benzimidazol-2-yl) ethanol, 2-(1H-benzoimidazol-2-yl)-acetamide, (6-methoxy-1H-benzimidazol-2-yl) methanol, 5,6-dimethoxybenzimidazole, 2-(1H-benzoimidazol-2-yl)-ethylamine, 1-(5-methyl-1H-benzimidazol-2-yl) methanamine, 1-(5-methyl-1H-benzimidazol-2-yl) ethanamine, 2-benzimidazolepropionic acid, 2-(5-methyl-1H-benzimidazol-2-yl) ethanamine, 2-(3-hydroxy-N-propyl)-5-(trifluoromethyl)-benzimidazole, and N-methyl-1-(5-methyl-1H-benzimidazol-2-yl) methanamine.

Metal organic frameworks comprising such imidazole or benzimidazole ligands are typically referred to as zeolitic imidazolate frameworks (ZIFs). In some embodiments, the metal organic framework is a zeolitic imidazolate framework. Examples of suitable metal organic frameworks include, but are not limited to isoreticular metal organic framework-3 (IRMOF-3), MOF-69A, MOF-69B, MOF-69C, MOF-70, MOF-71, MOF-73, MOF-74, MOF-75, MOF-76, MOF-77, MOF-78, MOF-79, MOF-80, DMOF-1-NH2, UCMCM-1-NH2, MOF-69-80, ZIF-1, ZIF-2, ZIF-3, ZIF-4, ZIF-5, ZIF-6, ZIF-7, ZIF-8, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, and ZIF-725.

In a most preferred embodiment, the ZIF is ZIF-8 in which the imidazole ligand is 2-methylimidazole and the metal ion is Zn. In an embodiment, the ZIF may have a particulate form, for example in the form of spheres, granules, whiskers, sheets, flakes, plates, foils, fibers, and the like. In some embodiments, the ZIF includes particles having an average size of 0.1-10 μm, preferably 0.5-9 μm, preferably 1-8 μm, preferably 2-7 μm, preferably 3-6 μm, or preferably 4-5 μm. In some embodiments, the ZIF-8 has a Langmuir specific surface area of 1300-1700 $m^2/g$, 1350-1650 $m^2/g$, 1400-1600 $m^2/g$, or 1450-1550 $m^2/g$, and a BET specific surface area of 1100-1300 $m^2/g$, preferably 1150-1250 $m^2/g$, or about 1200 $m^2/g$. In some embodiments, the ZIF-8 has a specific pore volume of 0.3-0.7 $m^3/g$, preferably 0.4-0.6 $m^3/g$, or about 0.5 $m^3/g$, and a pore size of 0.5-5 nm, preferably 1-4.5 nm, 1.5-4.0 nm, 2.0-3.5 nm, or 2.5-3.0 nm.

In an embodiment, the composite is made by a method including preparing the ZIF-8 and then hydrothermally reacting the ZIF-8 with metal salts of metals in the XMgAl mixed hydroxide to form the composite. The precursors of the mixed hydroxide include metal salts of Mg, Al and Zn, Co, Mn, or Cu, preferably the salts are nitrate salts. The method allows for the salts to penetrate pores of the ZIF-8 where the particles of the mixed oxide are then formed by the hydrothermal reaction. In some embodiments, particles of the XMgAl mixed hydroxide are dispersed within pores of the ZIF-8. In some embodiments, the particles of the XMgAl mixed hydroxide are further dispersed on a surface of the ZIF-8. In some embodiments, the ZIF-8 and the mixed hydroxide remain separate crystalline entities in the composite and do not interact through covalent bonds.

In some embodiments, the composite contains 30-70 wt. % of the mixed hydroxide, preferably 35-65 wt. %, 40-60 wt. %, or 45-55 wt. % of the mixed hydroxide and 30-70 wt. % of the ZIF-8, preferably 35-65 wt. %, 40-60 wt. %, 45-55 wt. % of the ZIF-8 based on a total weight of the composite.

In some embodiments, the composite has a Langmuir specific surface area of 20-60 $m^2/g$, preferably 25-55 $m^2/g$, 30-50 $m^2/g$, 35-45 $m^2/g$, or 40 $m^2/g$. In some embodiments, the composite has a BET specific surface area of 10-45 $m^2/g$, preferably 15-40 $m^2/g$, 20-35 $m^2/g$, or 25-30 $m^2/g$. In some embodiments, the composite has a specific pore volume of 0.01-0.5 $m^3/g$, preferably 0.10-0.4 $m^3/g$, or about 0.20-0.30 $m^3/g$. In some embodiments, the composite has a pore size of 5-25 nm, preferably 10-20 nm, or 13-16 nm.

In some embodiments, the composite is further supported on at least one support selected from the group consisting of a graphene-based material, an alumina, a carbon nanotube, an activated carbon, a metal organic framework (MOF), and a zeolitic imidazolate framework (ZIF).

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise, they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanomaterial is activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanomaterial is carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In alternative embodiments, mixtures of types of particles are used.

As used herein, the term "zeolitic," "zeolite," "zeolitic materials," and similar terms generally refer to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and if appropriate, $AlO_4$)tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages. Zeolites which are devoid of aluminum may be referred to as "all-silica zeolites" or "aluminum-free zeolites". Some zeolites which are substantially free of, but not devoid of, aluminum are referred to as "high-silica zeolites". Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework. In some embodiments, the porous silicate and/or aluminosilicate matrix is a zeolitic material having a zeolite framework selected from the group consisting of ZSM-5, ZSM-8, ZSM-11, ZSM-12, ZSM-18, ZSM-23, ZSM-35 and ZSM-39.

In some embodiments, the support is aluminum oxide. In some embodiments, the aluminum oxide is gamma (γ) aluminum oxide. In some embodiments, the aluminum oxide may include, but are not limited to, alpha (α) aluminum oxide and beta (β) aluminum oxide.

In some embodiments, the porous support is present in the form of particles. In general, the porous support particles can be any shape known to one of ordinary skill in the art. Examples of suitable shapes the metal organic framework particles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, nanotubes, blocks, flakes, discs, granules, angular chunks, and mixtures thereof.

In some embodiments, the porous support particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of porous support particles having a different shape. As used herein, the term "non-uniform shape" refers to an average consistent shape that differs by more than 10% of the distribution of porous support particles having a different shape. In one embodiment, the shape is uniform and at least 90% of the porous support particles are spherical or substantially circular, and less than 10% are polygonal. In another embodiment, the shape is non-uniform and less than 90% of the porous support particles are spherical or substantially circular, and greater than 10% are polygonal.

In some embodiment, the porous support is in the form of particles having a mean particle size of 100 to 10,000 nm, preferably 125 to 9,500 nm, preferably 150 to 9,000 nm, preferably 175 to 8,500 nm preferably 200 to 8,000 nm, preferably 250 to 7,500 nm. In embodiments where the porous support particles are spherical, the particle size may refer to a particle diameter. In embodiments where the porous support particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the porous support particles have an anisotropic shape such as nanorods or nanotubes, the particle size may refer to a length of the nanorod or nanotube, a width of the nanorod or nanotube, or an average of the length and width of the nanorod or nanotube. In some embodiments, the particle size refers to the diameter of a sphere having an equivalent volume as the particle.

At step 106, the method 100 includes continuously agitating the composite mixture in the reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the composite mixture occupies at least $1/20$, $1/10$, $3/10$, $1/2$, $2/3$, $4/5$, or $9/10$ of the reactor volume. In still yet some other embodiments, the composite mixture occupies no more than $10/11$, $9/10$, $4/5$, $2/3$, $1/2$, $3/10$, or $1/10$ of the reactor volume.

At step 108, the method 100 includes introducing the $H_2S$-containing gas composition to the reactor containing the composite mixture under continuous agitation and passing the $H_2S$-containing gas composition through the composite mixture.

In some embodiments, the $H_2S$-containing gas composition is natural gas.

In some embodiments, the $H_2S$-containing gas composition further comprises at least one hydrocarbon selected from the group consisting of methane, ethane, ethylene, propylene, propane, butane, butene, butadiene, and/or isobutylene. The hydrocarbon may further or alternatively include dimethyl ether, ethyl methyl ether, neopentane. The hydrocarbon may comprise at least 20, 40, 60, 80, 90, 95, 99.5, or 99.9 wt. % methane, ethane, ethylene, propylene, propane, butane, butene, butadiene, and/or isobutylene, based on a total weight of hydrocarbons. Other ranges are also possible.

In some embodiments, the $H_2S$-containing gas composition may further comprise $CO_2$, and the $CO_2$ may be present in 2, 5, 10, 15, 20, 25, 30, 40, 50, 60, 65, 75, 85, 100, 150, 200, 250-fold the amount, or more, of the $H_2S$ based on moles. The gas composition may further contain $N_2$, CO, Ar, $H_2$, He, $NH_3$, $O_2$, and/or $O_3$, but may exclude any or all of these. Although, other gasses may be present in the gas composition, the composite selectively adsorbs the $H_2S$ and does not adsorb any of the other gases.

In some embodiments, the $H_2S$ is present in the gas composition at a concentration in a range of 10 to 200 parts per million by volume (ppmv), preferably 20 to 180 ppmv, preferably 40 to 160 ppmv, further preferably 60 to 140 ppmv, more preferably 80 to 12 ppmv, or even more preferably 100 ppmv, based on a total volume of the gas composition. Other ranges are also possible.

In some embodiments, the composite is present in the liquid at a concentration in a range of from 0.5 to 2 milligrams per milliliter (mg/mL), preferably 0.75-1.75 mg/mL, 1.00-1.50 mg/mL, or about 1.25 mg/mL.

In some embodiments, the H$_2$S-containing gas composition is introduced to the reactor at a rate of from 0.4 to 2.0 milliliters per minute (mL/min) per milligram of the composite, preferably 0.5 to 1.8, preferably 0.6 to 1.6, preferably 0.7 to 1.4, preferably 0.8 to 1.2, preferably 0.9 to 1.1, or 1.0 mL/min per milligram of the composite. Other ranges are also possible.

In some embodiments, the composite mixture is in contact with the H$_2$S-containing gas composition at a temperature in a range of from 15 to 40° C., preferably 20 to 35° C., preferably 25 to 30° C. under a pressure of 0.9 to 1.2 bar, preferable 0.95 to 1.15 bar, preferably 1.0 to 1.1 bar. Other ranges are also possible.

At step 108, the inventive method 100 may be carried out at pHs in the neutral range and/or above 4, though the efficiency of the H$_2$S removal should be within 90% across the pH range of 2 to 13, 3 to 11, 4 to 10, 5 to 8, or 6 to 7.5. No particular considerations need to be taken regarding pH, and acceptable reaction pHs will generally be at the ambient/natural conditions of water available.

At step 110, the method 100 includes adsorbing the H$_2$S from the H$_2$S-containing gas composition onto the composite to remove the H$_2$S from the H$_2$S-containing gas composition and form a purified gas composition.

As used herein, the term "breakthrough time" refers to the elapsed time between initial contact of the composite mixture with the H$_2$S-containing gas composition and the time at which H$_2$S is detected in the purified gas composition. In accordance with the present disclosure, the detection limit for H$_2$S in a gas composition is 0.5 ppm, based on a total weight of the gas composition.

As used herein, the term "saturation time" refers to the time during which the adsorbent is saturated (in equilibrium) with the adsorbate.

As used herein, the term "scavenging capacity," "adsorption capacity", and similar terms generally refer to the amount of adsorbate taken up by the adsorbent per unit mass or per unit volume of the adsorbent. In accordance with the present disclosure, the term refers to the amount of H$_2$S taken up by the composite per gram of the compound.

In some embodiments, the H$_2$S content in the purified gas composition after adsorbing by the composite is no more than 100 ppmv, 80 ppmv, 60 ppmv, 40 ppmv, 20 ppmv, or 10 ppmv, based on a total volume of the purified gas composition for 1 to 10 minutes, preferable 2 to 5 minutes, preferably about 3 minutes of contact with the composite at a temperature in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C. Other ranges are also possible.

In some embodiments, the XMgAl mixed hydroxide is a CuMgAl mixed hydroxide. In some embodiments, the composite is present in the aqueous media at a concentration of 1 mg/mL, the composite is in contact with the gas composition containing 100 ppmv of H$_2$S at a rate of 80 mL/min in the stirred tank reactor, and the composite has a breakthrough time of from 15-20 hours, preferably 16-19 hours, or about 17-18 hours and a saturation time of from 18-22 hours, preferably 19-21 hours, or about 20 hours. In some embodiments, the composite has a saturation scavenging capacity of 100-150 mg of hydrogen sulfide per gram of composite in the reactor, preferably 110-140 mg/g, or 120-130 mg/g.

The examples below are intended to further illustrate protocols for preparing, characterizing, and using the composite and for performing the method described above and are not intended to limit the scope of the claims.

EXAMPLES

The following examples describe and demonstrate a process for removing hydrogen sulfide (H$_2$S) from a H$_2$S-containing gas composition described herein. The examples are provided solely for illustration and are not to be construed as limitations of the present disclosure, as many variations thereof are possible without departing from the spirit and scope of the present disclosure.

Example 1: Preparation of MnMgAl Layered Triple Hydroxide and Layered Triple Oxide The MnMgAl layered triple hydroxide (LTH) was synthesized using a hydrothermal method as follows. First, solution A was prepared by dissolving certain amounts of NaOH and Na$_2$CO$_3$ in a specific volume of distilled water to give 335 and 28 mM NaOH and Na$_2$CO$_3$, respectively. In parallel, solution B was prepared by dissolving certain amounts of Mn(NO$_3$)$_2$·6H$_2$O, Mg(NO$_3$)$_2$·6H$_2$O, and Al(NO$_3$)$_3$·9H$_2$O in a specific volume of distilled water to give 152.2, 15.2, and 55.8 mM Mn$^{2+}$, Mg$^{2+}$, and Al$^{3+}$, respectively. The total molar concentration of Mn$^{2+}$, Mg$^{2+}$, and Al$^{3+}$ was 223.2 mM. The molar ratio of Mn$^{2+}$:Mg$^{2+}$:Al$^{3+}$ was 10:1:3.7.

After the preparation of solutions A and B, the two solutions were simultaneously added dropwise to a beaker. The pH of the mixture in the beaker was kept at 10.5±0.5 via controlling the addition rate of solutions A and B. The mixture in the beaker was continuously stirred at room temperature under ambient air during the addition of solutions A and B. The mixture was further stirred for additional 30 minutes after the addition is complete. Then, the produced suspension was transferred into an autoclave reactor and placed in an oven at 120° C. for 24 h. The crude MnMgAl-LTH was then washed several times with distilled water in order to remove impurities. The solid paste was dried overnight at 80° C. to give the purified solid MnMgAl LTH. The solid MnMgAl LTH was then calcined at 500° C. for 3 hours to yield a MnMgAl layered triple oxide (LTO).

Example 2: Preparation of ZnMgAl Layered Triple Hydroxide and Layered Triple Oxide For the preparation of a ZnMgAl LTH, a similar procedure as Example 1 was used, but Mn(NO$_3$)$_2$·6H$_2$O was replaced with equimolar Zn(NO$_3$)$_2$·6H$_2$O. To obtain a ZnMgAl LTO the produced solid ZnMgAl LTH was calcined at 500° C. for 3 hours.

Example 3: Preparation of CoMgAl Layered Triple Hydroxide

For the preparation of a CoMgAl LTH, a similar procedure as Example 1 was used, but Mn(NO$_3$)$_2$·6H$_2$O was replaced with equimolar Co(NO$_3$)$_2$·6H$_2$O.

Example 4: Preparation of MnFeAl Layered Triple Hydroxide and Layered Triple Oxide The MnFeAl LTH was synthesized using a hydrothermal method as follows. First, solution A was prepared by dissolving certain amounts of NaOH and $Na_2CO_3$ in a specific volume of distilled water to give 335 and 28 mM NaOH and $Na_2CO_3$, respectively. In parallel, solution B was prepared by dissolving certain amounts of $Mn(NO_3)_2 \cdot 6H_2O$, $Fe(NO_3)_3 \cdot 6H_2O$, and $Al(NO_3)_3 \cdot 9H_2O$ in a specific volume of distilled water to give 167.4, 27.9, and 27.9 mM $Mn^{2+}$, $Fe^{3+}$, and $Al^{3+}$, respectively. The total molar concentration of $Mn^{2+}$, $Fe^{2+}$, and $Al^{3+}$ was 223.2 mM. The molar ratio of $Mn^{2+}:Fe^{3+}:Al^{3+}$ was 6:1:1.

After the preparation of solutions A and B, the two solutions were simultaneously added dropwise to a beaker. The pH of the mixture in the beaker was kept at 10.5±0.5 via controlling the addition rate of solutions A and B. The mixture in the beaker was continuously stirred at room temperature under ambient air during the addition of solutions A and B. The mixture was further stirred for additional 30 minutes after the addition is complete. Then, the produced suspension was transferred into an autoclave reactor and placed in an oven at 120° C. for 24 h. The crude MnFeAl-LTH was then washed several times with distilled water in order to remove impurities. The solid paste was dried overnight at 80° C. to give the purified solid MnFeAl-LTH. The solid MnFeAl-LTH was then calcined at 500° C. for 3 hours to yield a MnFeAl-LTO.

Example 5: Preparation of ZnFeAl Layered Triple Hydroxide and Layered Triple Oxide For the preparation of a ZnFeAl LTH, a similar procedure as Example 4 was used, but $Mn(NO_3)_2 \cdot 6H_2O$ was replaced with equimolar $Zn(NO_3)_2 \cdot 6H_2O$. To obtain a ZnFeAl LTO the produced solid ZnFeAl LTH was calcined at 500° C. for 3 hours.

Example 6: Preparation of CoFeAl Layered Triple Hydroxide and Layered Triple Oxide For the preparation of a CoFeAl LTH, a similar procedure as Example 4 was used, but $Mn(NO_3)_2 \cdot 6H_2O$ was replaced with equimolar $Co(NO_3)_2 \cdot 6H_2O$. To obtain a CoFeAl LTO the produced solid CoFeAl LTH was calcined at 500° C. for 3 hours.

Example 7: Preparation of CuFeAl Layered Triple Hydroxide

For the preparation of a CuFeAl LTH, a similar procedure as Example 4 was used, but $Mn(NO_3)_2 \cdot 6H_2O$ was replaced with equimolar $Cu(NO_3)_2 \cdot 3H_2O$.

Example 8: Preparation of MnCuAl layered triple hydroxide and layered triple oxide The MnCuAl LTH was synthesized using a hydrothermal method as follows. First, solution A was prepared by dissolving certain amounts of NaOH and $Na_2CO_3$ in a specific volume of distilled water to give 335 and 28 mM NaOH and $Na_2CO_3$, respectively. In parallel, solution B was prepared by dissolving certain amounts of $Mn(NO_3)_2 \cdot 6H_2O$, $Cu(NO_3)_2 \cdot 3H_2O$, and $Al(NO_3)_3 \cdot 9H_2O$ in a specific volume of distilled water to give 111.6, 55.8, and 55.8 mM $Mn^{2+}$, $Cu^{2+}$, and $Al^{3+}$, respectively. The total molar concentration of $Mn^{2+}$, $Cu^{2+}$, and $Al^{3+}$ was 223.2 mM. The molar ratio of $Mn^{2+}:Cu^{2+}:Al^{3+}$ was 2:1:1.

After the preparation of solutions A and B, the two solutions were simultaneously added dropwise to a beaker. The pH of the mixture in the beaker was kept at 10.5±0.5 via controlling the addition rate of solutions A and B. The mixture in the beaker was continuously stirred at room temperature under ambient air during the addition of solutions A and B. The mixture was further stirred for additional 30 minutes after the addition is complete. Then, the produced suspension was transferred into an autoclave reactor and placed in an oven at 120° C. for 24 h. The crude MnCuAl-LTH was then washed several times with distilled water in order to remove impurities. The solid paste was dried overnight at 80° C. to give the purified solid MnCuAl-LTH. The solid MnCuAl-LTH was then calcined at 500° C. for 3 hours to yield a MnCuAl-LTO.

Example 9: Preparation of ZIF-8

ZIF-8 was prepared starting from zinc nitrate hexahydrate and 2-methylimidazole (2-MIM) as precursors. The zinc nitrate hexahydrate solution (50 mM) was prepared by dissolving a certain amount of zinc nitrate hexahydrate in a specific volume of distilled water. The 2-MIM solution (200 mM) was prepared by dissolving the desired mass of 2-MIM in 25% ammonia solution. The volumes of both solutions were approximately the same. Then, the zinc solution was added quickly to the 2-MIM solution under a vigorous stirring at room temperature. Upon the completion of the zinc solution addition, the vigorous stirring of the reaction mixture was continued for 1 h to ensure the completion of the reaction. After that, the formed ZIF-8 was kept standing for additional 1 h. Then, ZIF-8 was collected by centrifugation for 30 min at 8000 rpm. To remove the unreacted precursors, the collected ZIF-8 was washed several times with distilled water (30 min each cycle). Then, the purified ZIF-8 was dried at 60° C.

Example 10: Preparation of ZIF-8 and ZnMgAl Hydroxide Composite

The ZIF-8 and ZnMgAl hydroxide composite was synthesized using a hydrothermal method as follows. A certain amount of ZIF-8 was dispersed in distilled water (2.5 g/L) and sonicated for 1 h. Then, the pH of the ZIF-8 suspension was adjusted to 10 using an aqueous mixture of NaOH and $Na_2CO_3$. Another aqueous solution containing nitrate salts of Zn, Mg, and Al was prepared by mixing appropriate amounts of the metal salts with a $Zn^{2+}:Mg^{2+}:Al^{3+}$ molar ratio of 10:1:3.67. Then, the $NaOH/Na_2CO_3$ solution and the Zn, Mg, and Al salt solution were simultaneously added dropwise to the ZIF-8 dispersion under stirring, keeping the pH of the ZIF-8 dispersion within 10-12. After the mixture was stirred for 10 min before transferring it into an autoclave reactor, which was placed in an oven at 120° C. for 20 h. The produced ZIF-8 and ZnMgAl hydroxide composite was purified with distilled water, dried, and ground into fine particles before use.

Example 11: Preparation of ZIF-8 and CoMgAl Hydroxide Composite

For the preparation of ZIF-8 and CoMgAl hydroxide composite a similar procedure as Example 10 was used, but Zn was replaced with equimolar Co.

Example 12: Preparation of ZIF-8 and CuMgAl Hydroxide Composite

For the preparation of ZIF-8 and CuMgAl hydroxide composite a similar procedure as Example 10 was used, but Zn was replaced with equimolar Cu.

Example 13: Preparation of ZIF-8 and MnMgAl Hydroxide Composite

For the preparation of ZIF-8 and MnMgAl hydroxide composite a similar procedure as Example 10 was used, but Zn was replaced with equimolar Mn.

Example 14: Composite Characterization Techniques

BET analysis of nitrogen adsorption-desorption isotherm and pore-size distribution curves of the composite was measured on a Quantachrome Autosorb 1-C instrument with $N_2$ adsorption at 77 K. The composite was outgassed at 120° C. without exposure to air before nitrogen loading. The BET surface area was determined with a P/P0 range of 0.01 to 0.04. Analysis of isotherms was carried out by applying various methods to obtain different information. The BET equation was used to get the BET surface area from the $N_2$ isotherm. The T-method was used to find the micropore volume and the external surface area of the mesoporous fraction from the volume of $N_2$ adsorbed up to the P/P0-0.0315.

Example 15: MnMgAl LTH and LTO Performance

The MnMgAl LTH or LTO (0.1 g) was dispersed in 100 mL water (pH 7) via magnetic stirring (700 rpm). A sour gas stream containing $H_2S$ (100.2 ppm) in methane was introduced to the continuously stirred tank reactor (CSTR) at a flow rate of 80 mL/min. The reactor volume was 150 mL. The gas exiting the reactor was sent to an $H_2S$ gas detector with a detection limit of 0.5 ppm. The exit gas was monitored and the concentration of $H_2S$ in the treated gas was continuously recorded. The experiments were conducted at ambient conditions (room temperature and atmospheric pressure).

Figure 2:
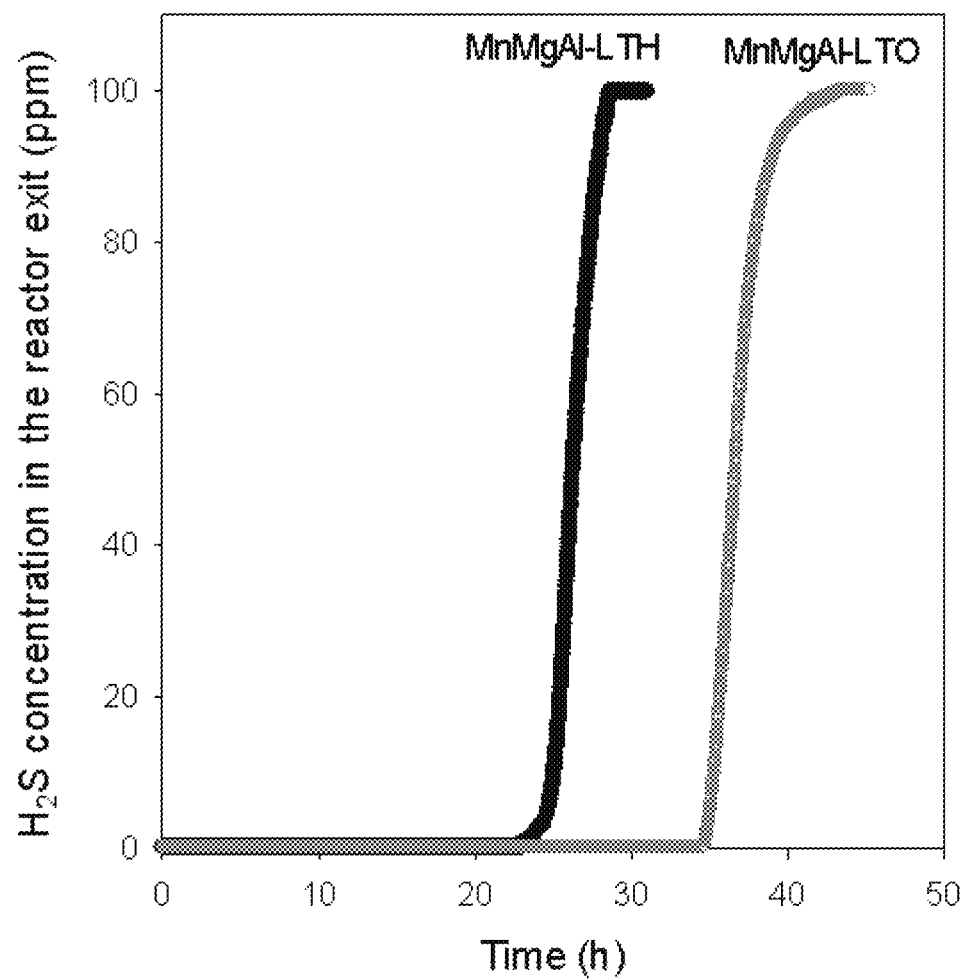
FIG. 2 illustrates a breakthrough curve of a MnMgAl-layered triple hydroxide (LTH) and a MnMgAl-layered triple oxide (LTO), according to certain embodiments.

FIG. 2 shows the breakthrough curve obtained using the MnMgAl LTH or LTO under the above conditions in the CSTR. The breakthrough time for the MnMgAl LTH was 1375 minutes while the saturation time was 1725 minutes. The $H_2S$ scavenging capacities for the MnMgAl LTH at the breakthrough and the saturation times were 152.7 and 175.3 mg $H_2S$/g catalyst, respectively. The breakthrough time for the MnMgAl LTO was 2080 minutes while the saturation time was 2600 minutes. The $H_2S$ scavenging capacities for the MnMgAl LTO at the breakthrough and the saturation times were 231.1 and 246.0 mg $H_2S$/g catalyst, respectively.

Example 16: ZnMgAl-LTH, CoMgAl-LTH, and MnMgAl-LTH Performance

Figure 3:
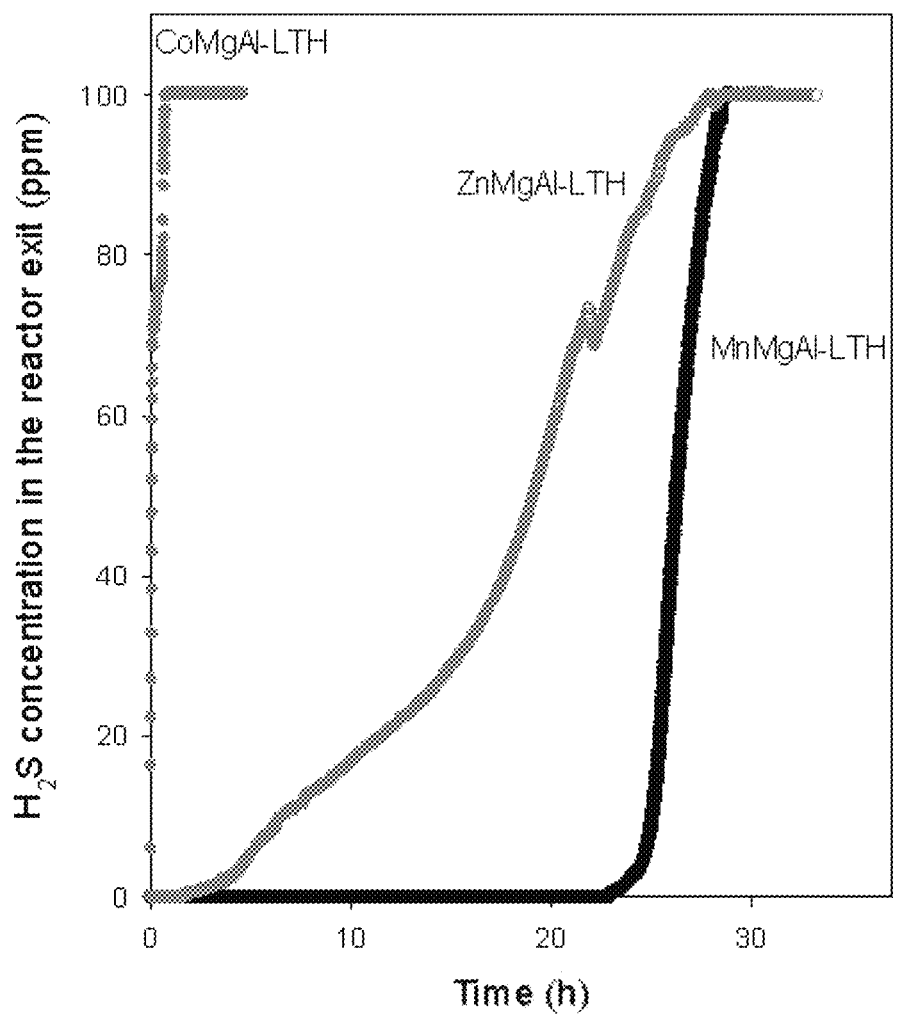
FIG. 3 illustrates a breakthrough curve of a CoMgAl-LTH, a ZnMgAl-LTH, and the MnMgAl-LTH, according to certain embodiments.

The ZnMgAl-LTH, CoMgAl-LTH, and MnMgAl-LTH were tested by a similar method to that described in Example 15. FIG. 3 shows the breakthrough curve obtained using the ZnMgAl-LTH, CoMgAl-LTH, and MnMgAl-LTH.

The breakthrough time for the CoMgAl LTH was 1 minute while the saturation time was 48 minutes. The $H_2S$ scavenging capacities for the CoMgAl LTH at the breakthrough and the saturation times were 0.16 and 1.42 mg $H_2S$/g catalyst, respectively.

The breakthrough time for the ZnMgAl LTH was 107 minutes while the saturation time was 1671 minutes. The $H_2S$ scavenging capacities for the ZnMgAl LTH at the breakthrough and the saturation times were 11.9 and 117.7 mg $H_2S$/g catalyst, respectively.

The breakthrough time for the MnMgAl LTH was 1375 minutes while the saturation time was 1725 minutes. The $H_2S$ scavenging capacities for the MnMgAl LTH at the breakthrough and the saturation times were 152.7 and 175.3 mg $H_2S$/g catalyst, respectively.

Example 17: ZnMgAl-LTO and MnMgAl-LTO Performance

Figure 4:
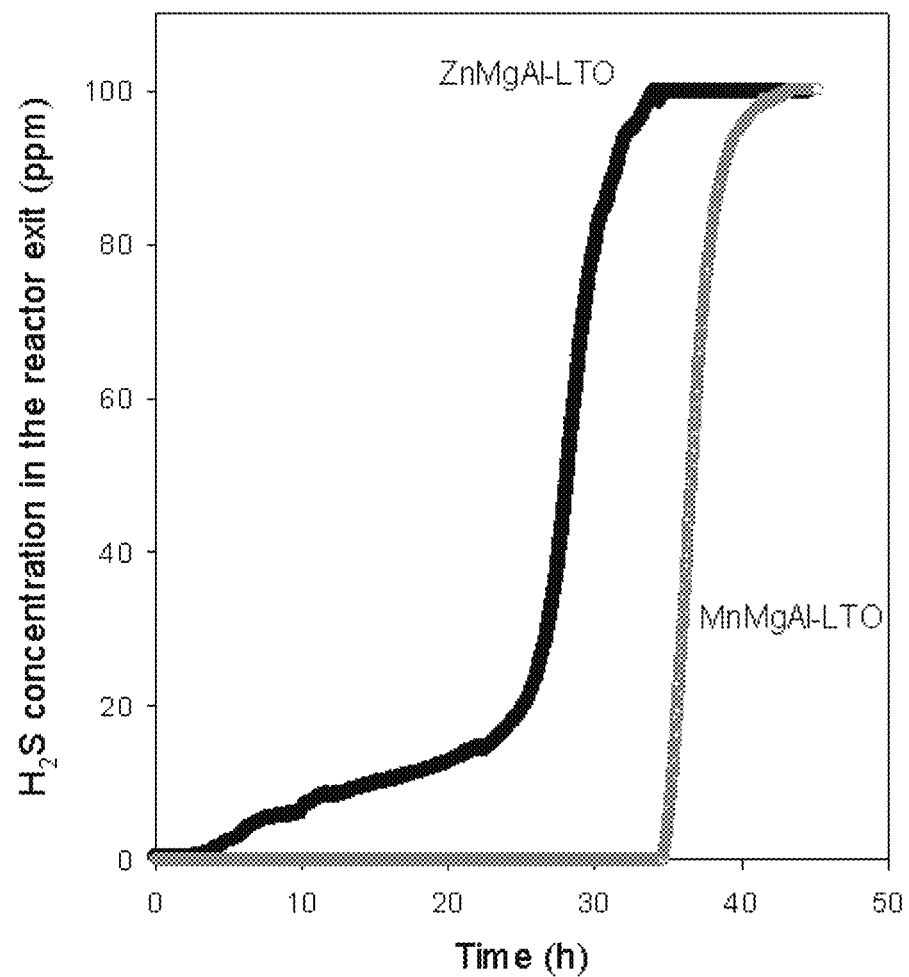
FIG. 4 illustrates a breakthrough curve of a ZnMgAl-LTO, and the MnMgAl-LTO, according to certain embodiments.

The ZnMgAl-LTO and MnMgAl-LTO were tested by a similar method to that described in Example 15. FIG. 4 shows the breakthrough curve obtained using the ZnMgAl-LTO and MnMgAl-LTO.

The breakthrough time for the MnMgAl-LTO was 2080 minutes while the saturation time was 2600 minutes. The $H_2S$ scavenging capacities for the MnMgAl-LTO at the breakthrough and the saturation times were 231.1 and 246 mg $H_2S$/g catalyst, respectively.

The breakthrough time for the ZnMgAl LTO was 1 minute while the saturation time was 2040 minutes. The $H_2S$ scavenging capacities for the ZnMgAl LTO at the breakthrough and the saturation times were 0.17 and 173.7 mg $H_2S$/g catalyst, respectively.

Example 18: CuFeAl-LTH and MnFeAl-LTH Performance

Figure 5:
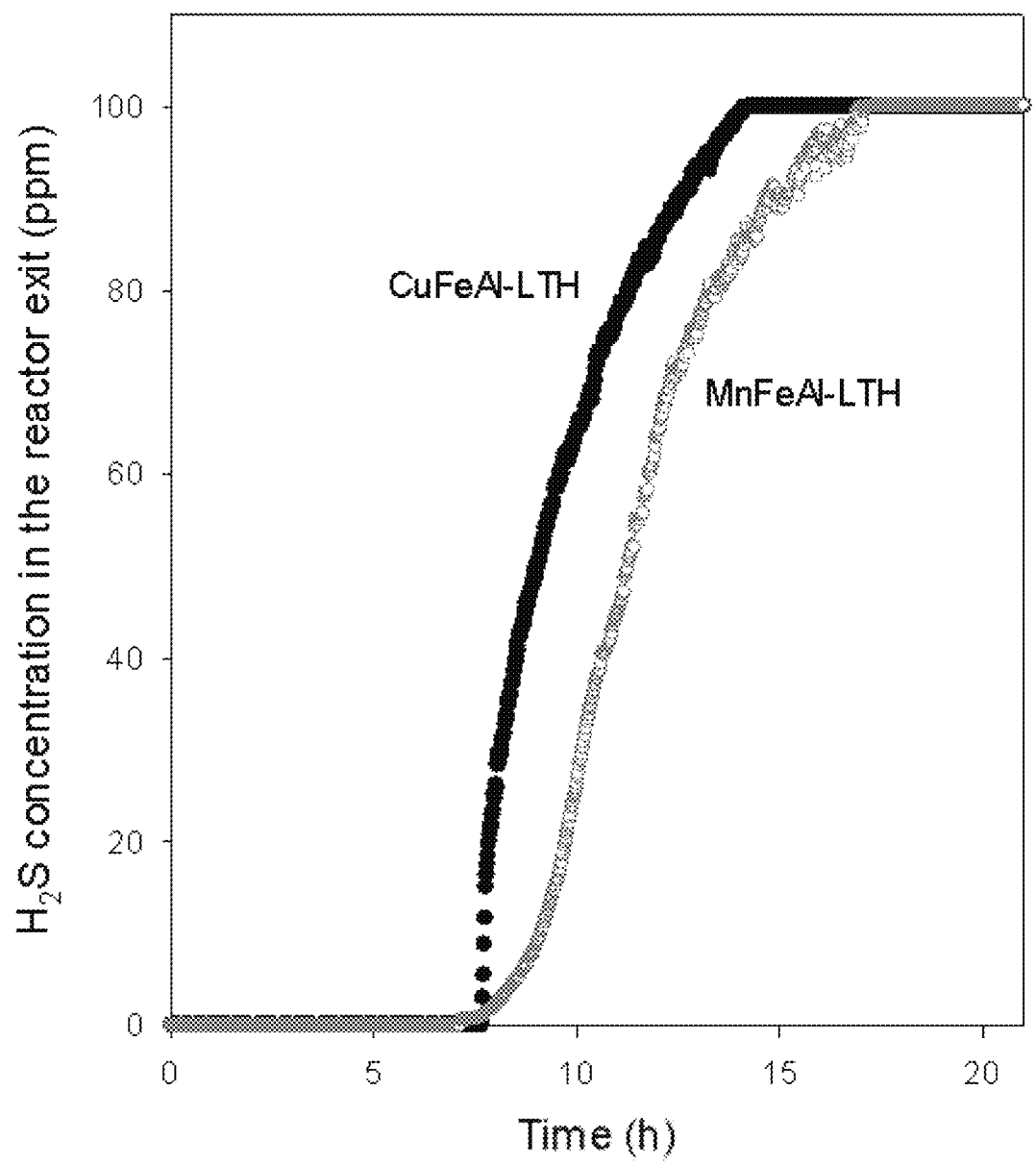
FIG. 5 illustrates a breakthrough curve of a CuFeAl-LTH and a MnFeAl-LTH, according to certain embodiments.

In this process, 25 mL of distilled water (pH 7) was placed in a bubble column reactor having a capacity of 60 mL. Then, the CuFeAl-LTH or MnFeAl-LTH (0.1 g) was dispersed in the distilled water via the raising bubble swarms of the sour gas stream. The sour gas stream of $H_2S$ (100.2 ppm) in methane was introduced at a flow rate of 80 mL/min. The gas exiting the reactor was sent to an $H_2S$ gas detector with a detection limit of 0.5 ppm. The exit gas was monitored and the concentration of $H_2S$ in the treated gas was continuously recorded. The experiments were conducted at ambient conditions (room temperature and atmospheric pressure). FIG. 5 shows the breakthrough curve obtained using the CuFeAl-LTH and MnFeAl-LTH.

The breakthrough time for the CuFeAl-LTH was 460 minutes while the saturation time was 860 minutes. The $H_2S$ scavenging capacities for the CuFeAl-LTH at the breakthrough and the saturation times were 51.4 and 64.2 mg $H_2S$/g catalyst, respectively.

The breakthrough time for the MnFeAl-LTH was 428 minutes while the saturation time was 1040 minutes. The $H_2S$ scavenging capacities for the MnFeAl-LTH at the breakthrough and the saturation times were 47.8 and 77.5 mg $H_2S$/g catalyst, respectively.

Example 19: ZnFeAl-LTO, ZnMgAl-LTO and CoFeAl-LTO Performance

Figure 6:
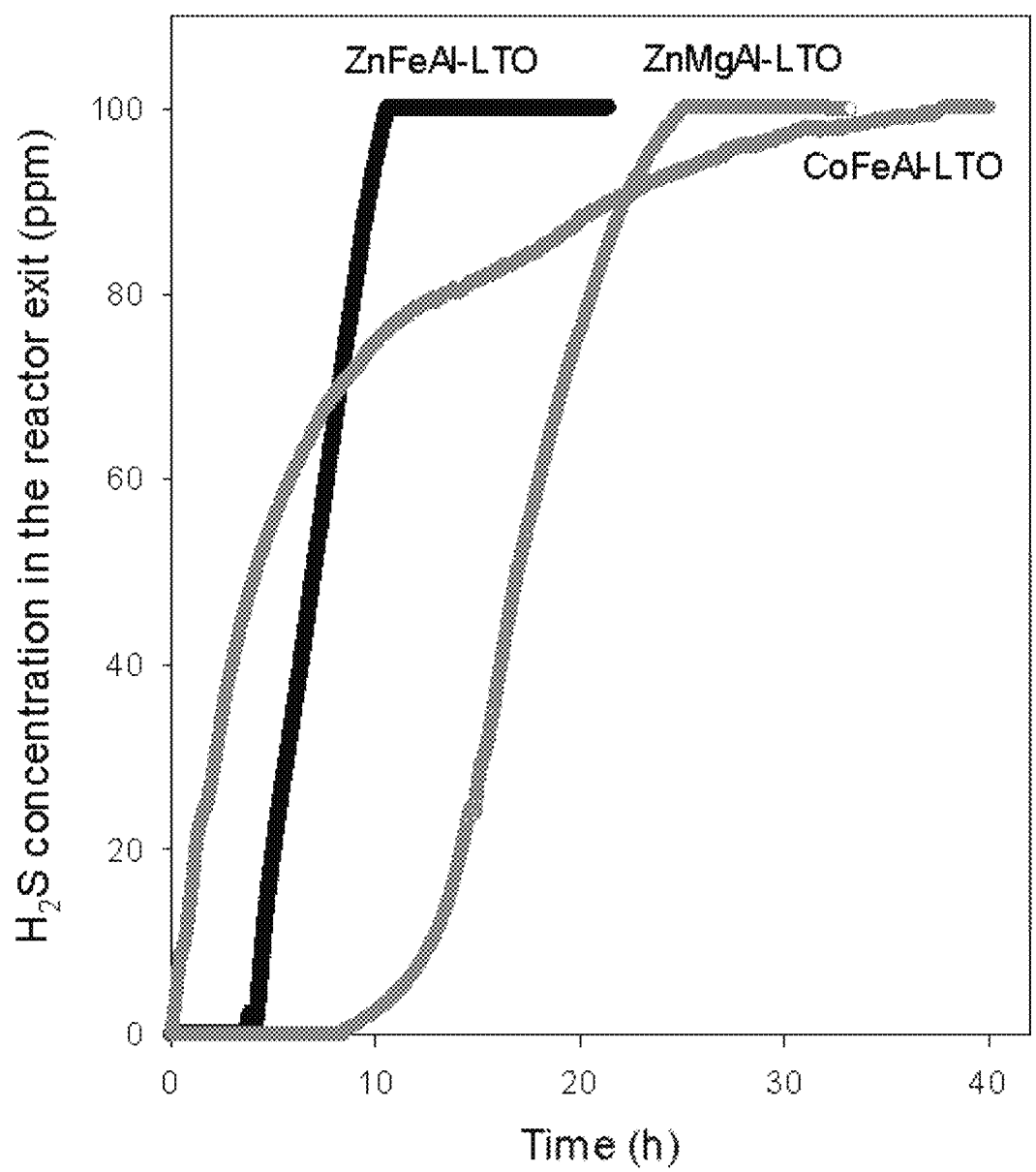
FIG. 6 illustrates a breakthrough curve of a ZnFeAl-LTO, the ZnMgAl-LTO, and a CoFeAl-LTO, according to certain embodiments.

The ZnMgAl-LTH, CoMgAl-LTH, and MnMgAl-LTH were tested by a similar method to that described in Example 18. FIG. 6 shows the breakthrough curve obtained using the ZnFeAl-LTO, ZnMgAl-LTO and CoFeAl-LTO.

The breakthrough time for the ZnMgAl-LTO was 505 minutes while the saturation time was 1500 minutes. The $H_2S$ scavenging capacities for the ZnMgAl-LTO at the breakthrough and the saturation times were 56.3 and 115.0 mg $H_2S$/g catalyst, respectively.

The breakthrough time for the ZnFeAl-LTO was 223 minutes while the saturation time was 638 minutes. The $H_2S$ scavenging capacities for the ZnFeAl-LTO at the breakthrough and the saturation times were 24.9 and 47.0 mg $H_2S$/g catalyst, respectively.

The breakthrough time for the CoFeAl-LTO was 3.5 minutes while the saturation time was 2263 minutes. The $H_2S$ scavenging capacities for the CoFeAl-LTO at the breakthrough and the saturation times were 0.45 and 52.0 mg $H_2S$/g catalyst, respectively.

Example 20: MnCuAl-LTH and MnCuAl-LTO Performance

Figure 7:
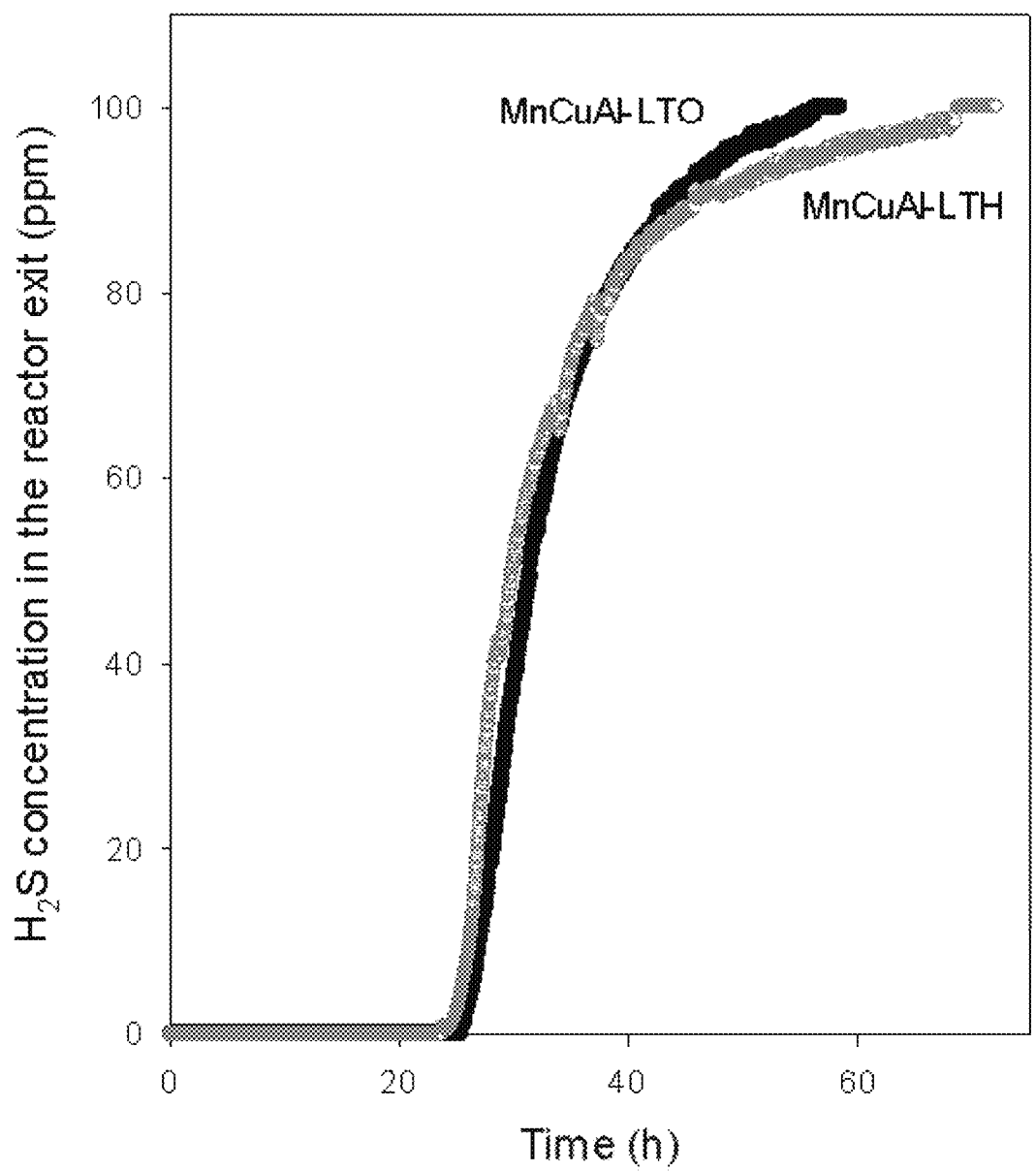
FIG. 7 illustrates a breakthrough curve of a MnCuAl-LTH and a MnCuAl-LTO, according to certain embodiments.

The MnCuAl-LTH and MnCuAl-LTO were tested by a similar method to that described in Example 18. FIG. 7 shows the breakthrough curve obtained using the MnCuAl-LTH and MnCuAl-LTO.

The breakthrough time for the MnCuAl-LTH was 1424 minutes while the saturation time was 4130 minutes. The $H_2S$ scavenging capacities for the MnCuAl-LTH at the breakthrough and the saturation times were 158.8 and 224.5 mg $H_2S$/g catalyst, respectively.

The breakthrough time for the MnCuAl-LTO was 1522 minutes while the saturation time was 3380 minutes. The $H_2S$ scavenging capacities for the MnCuAl-LTO at the breakthrough and the saturation times were 169.8 and 224.8 mg $H_2S$/g catalyst, respectively.

Example 21: ZnFeAl-LTH and ZnMgAl-LTH Performance

Figure 8:
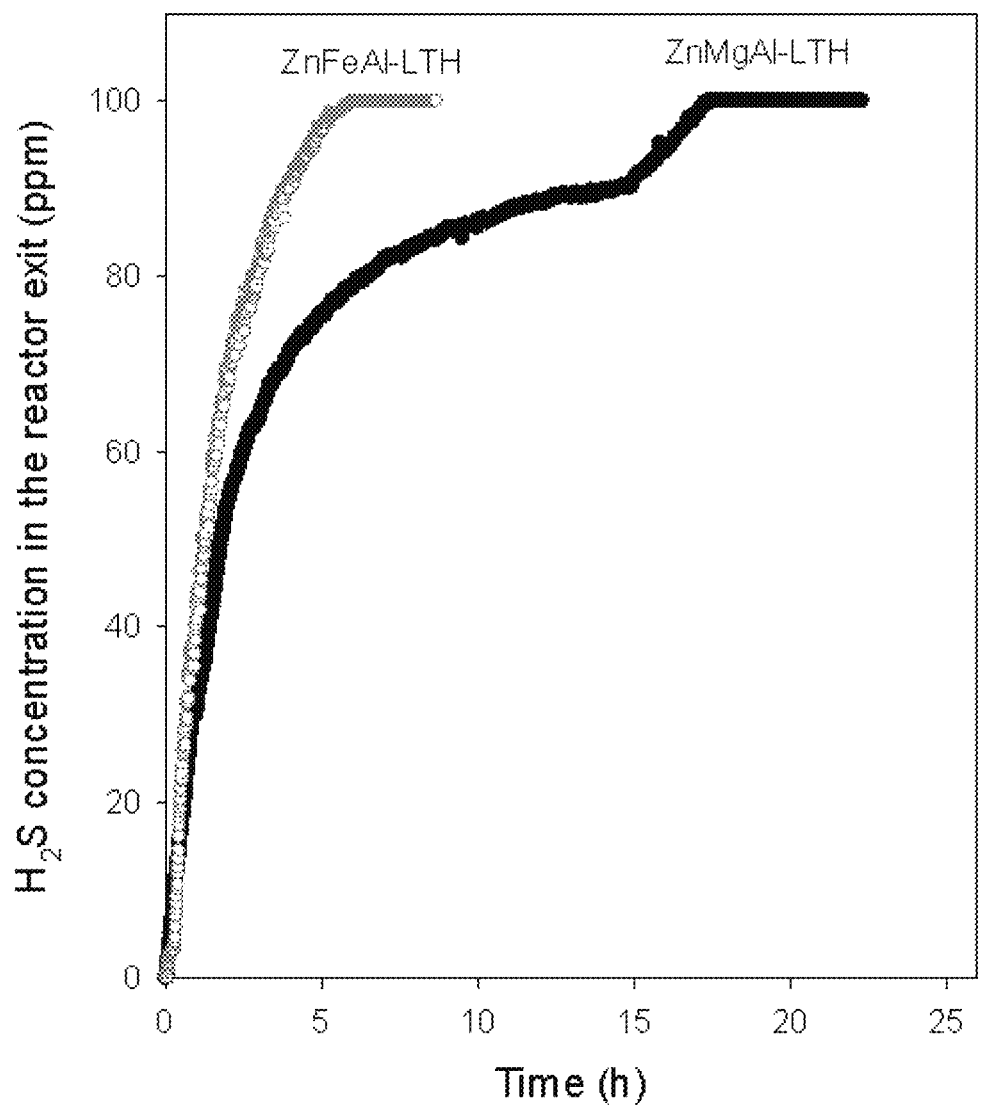
FIG. 8 illustrates a breakthrough curve of the ZnFeAl-LTH and the ZnMgAl-LTO, according to certain embodiments.

The ZnFeAl-LTH and ZnMgAl-LTH were tested by a similar method to that described in Example 18. FIG. 8 shows the breakthrough curve obtained using the ZnFeAl-LTH and ZnMgAl-LTH.

The breakthrough time for the ZnFeAl-LTH was 5 minutes while the saturation time was 361 minutes. The $H_2S$ scavenging capacities for the ZnFeAl-LTH at the breakthrough and the saturation times were 0.61 and 11.5 mg $H_2S$/g catalyst, respectively.

The breakthrough time for the ZnMgAl-LTH was 3 minutes while the saturation time was 1143 minutes. The $H_2S$ scavenging capacities for the ZnMgAl-LTH at the breakthrough and the saturation times were 0.39 and 26.7 mg $H_2S$/g catalyst, respectively.

It is also noteworthy to mention that the material loading can be adjusted depending on the $H_2S$ concentration in the $H_2S$-containing gas composition as well as the sour gases flow rate. The loading of the composite can be high such that it can form a thick reaction slurry (i.e., slurry phase reaction). Additionally, the stirring speed, medium pH, volume, reaction temperature, pressure, and gas inlet flow rate can be adjusted to meet the reactor configurations and design parameters.

Example 22: Composite Characterization

Figure 9:
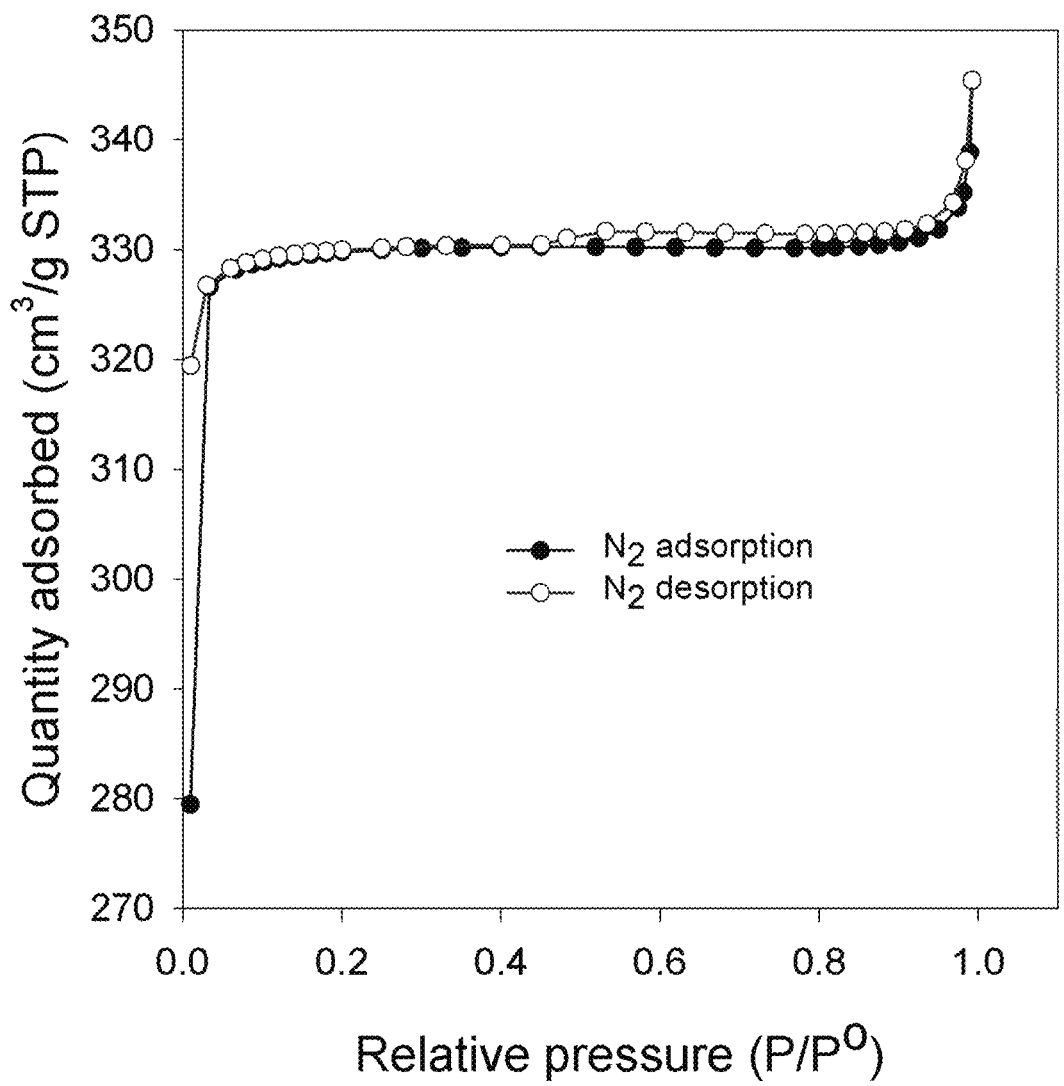
FIG. 9 illustrates isotherms of $N_2$ adsorption and desorption of ZIF-8, according to certain embodiments.

FIG. 9 shows isotherms of $N_2$ adsorption and desorption from the ZIF-8. The obtained Langmuir specific surface area, Brunauer-Emmett-Teller (BET) specific surface area, specific pore volume, and pore size were calculated as 1442.0 $m^2$/g, 1209.0 $m^2$/g, 0.5160 $m^3$/g, and 1.71 nm, respectively.

Figure 10:
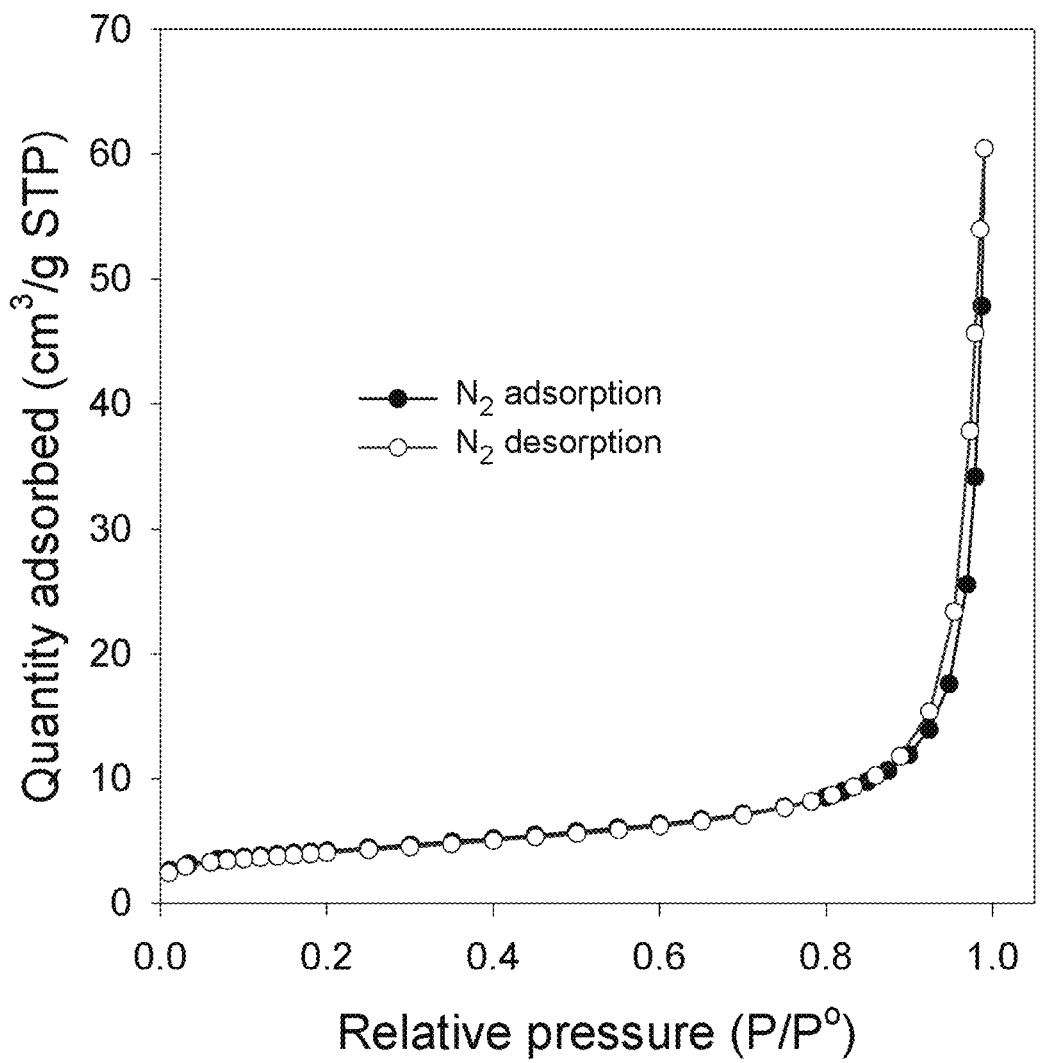
FIG. 10 illustrates isotherms of $N_2$ adsorption and desorption of a ZIF-8 and ZnMgAl composite, according to certain embodiments.

FIG. 10 shows isotherms of $N_2$ adsorption and desorption from the ZIF-8 and ZnMgAl hydroxide composite. The obtained Langmuir specific surface area, BET specific surface area, specific pore volume, and pore size were calculated as 21.01 $m^2$/g, 14.96 $m^2$/g, 0.0931 $m^3$/g, and 10.56 nm, respectively.

Figure 11:
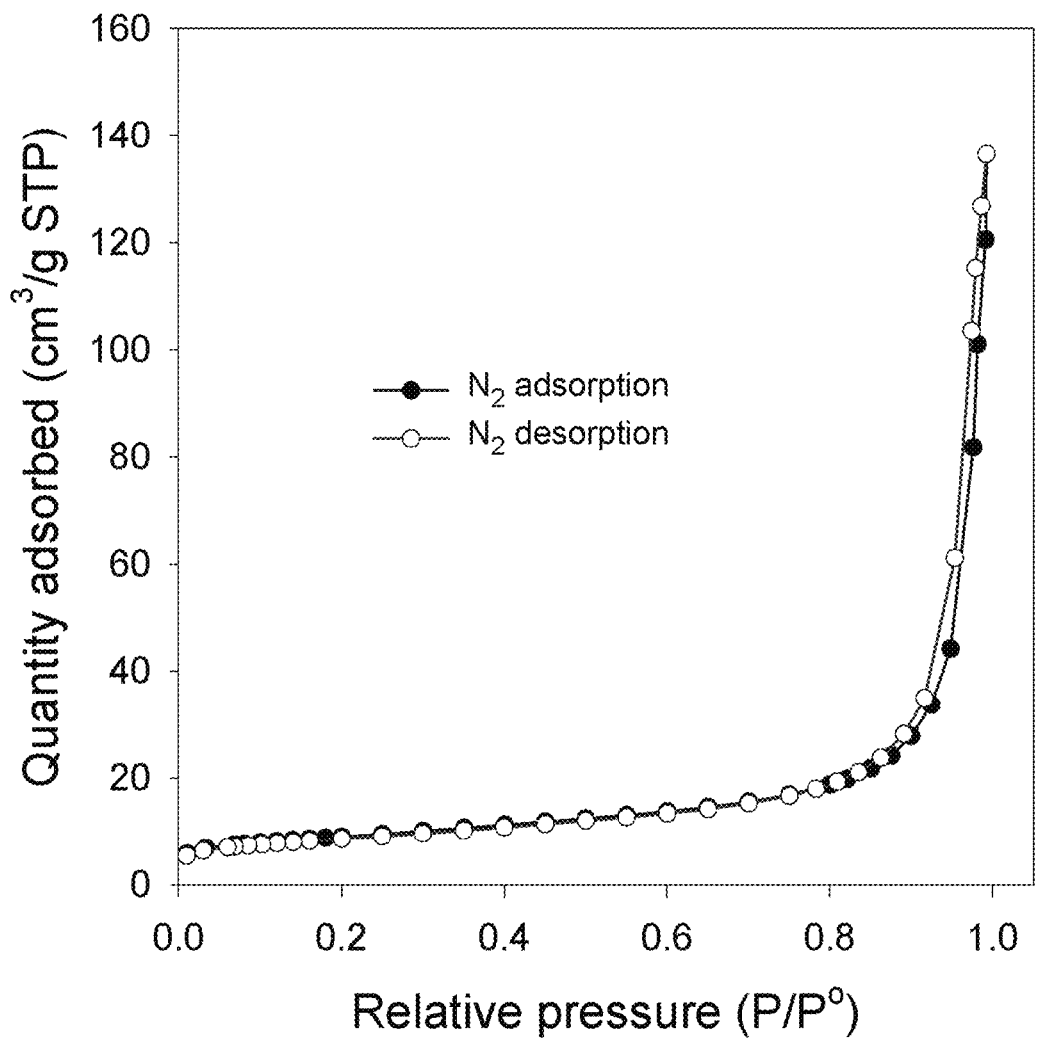
FIG. 11 illustrates isotherms of $N_2$ adsorption and desorption of a ZIF-8 and MnMgAl composite, according to certain embodiments.

FIG. 11 shows isotherms of $N_2$ adsorption and desorption from the ZIF-8 and MnMgAl hydroxide composite. The obtained Langmuir specific surface area, BET specific surface area, specific pore volume, and pore size were calculated as 45.25 $m^2$/g, 32.23 $m^2$/g, 0.2108 $m^3$/g, and 15.70 nm, respectively.

Figure 12:
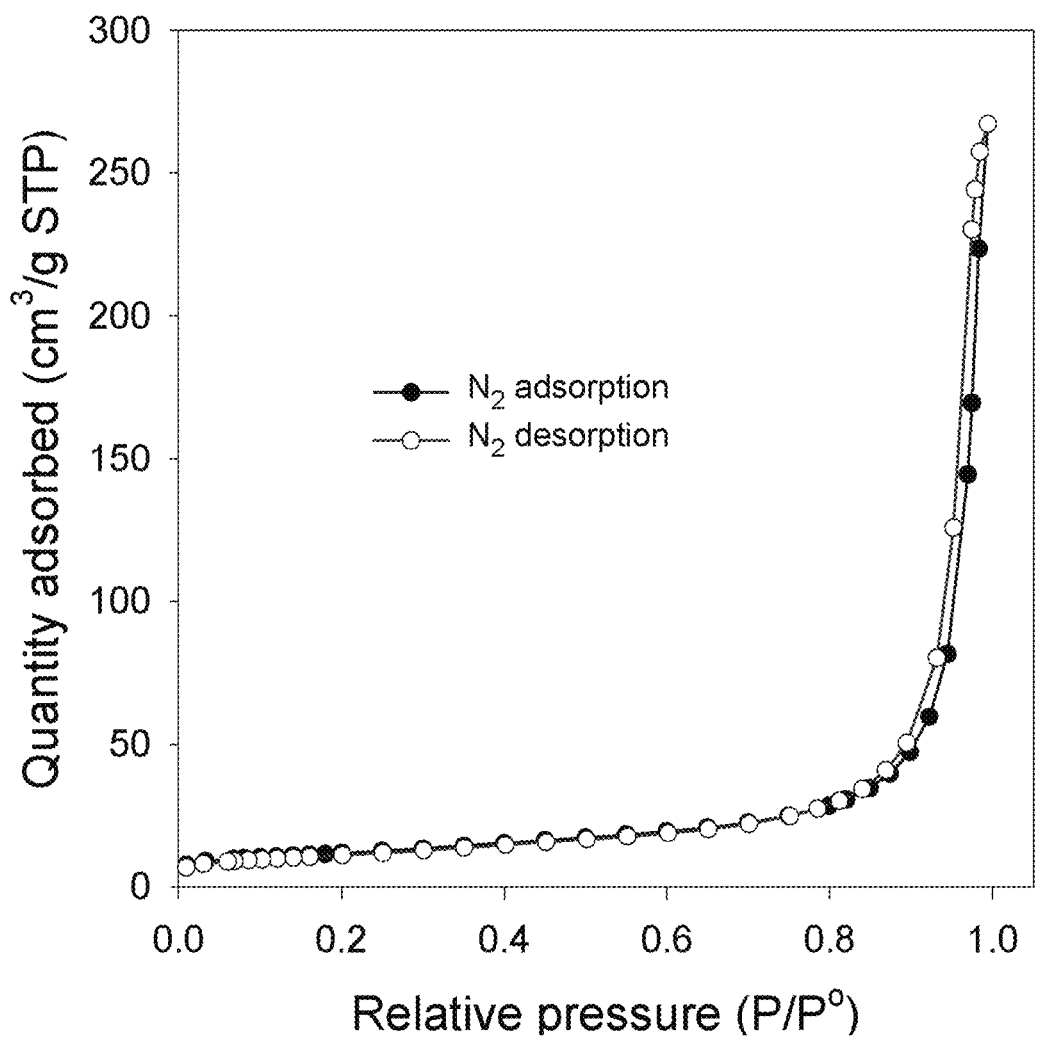
FIG. 12 illustrates isotherms of $N_2$ adsorption and desorption of a ZIF-8 and CoMgAl composite, according to certain embodiments.

FIG. 12 shows isotherms of $N_2$ adsorption and desorption from the ZIF-8 and CoMgAl hydroxide composite. The obtained Langmuir specific surface area, BET specific surface area, specific pore volume, and pore size were calculated as 60.17 $m^2$/g, 41.77 $m^2$/g, 0.4144 $m^3$/g, and 21.41 nm, respectively.

Figure 13:
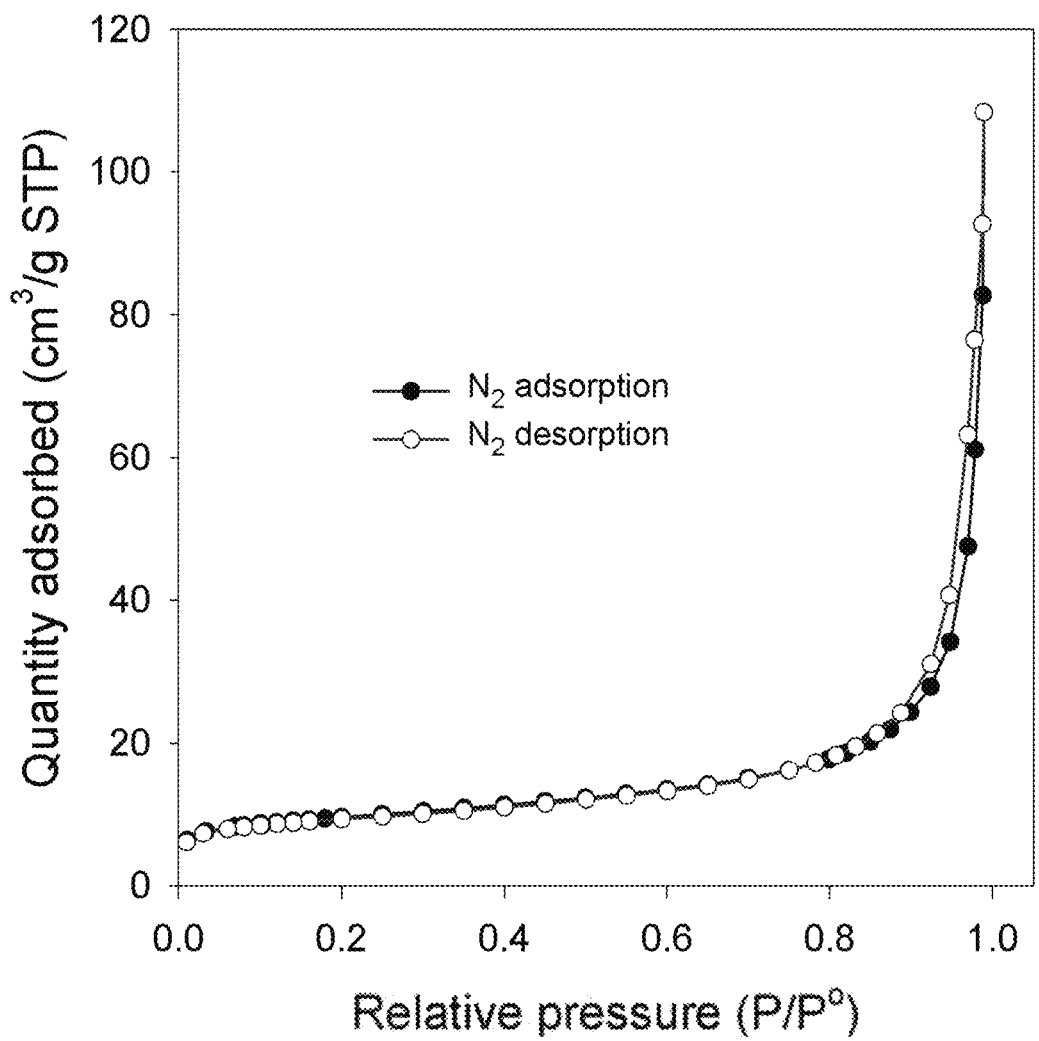
FIG. 13 illustrates isotherms of $N_2$ adsorption and desorption of a ZIF-8 and CuMgAl composite, according to certain embodiments.

FIG. 13 shows isotherms of $N_2$ adsorption and desorption from the ZIF-8 and CuMgAl hydroxide composite. The obtained Langmuir specific surface area, BET specific surface area, specific pore volume, and pore size were calculated as 46.81 $m^2$/g, 34.79 $m^2$/g, 0.1636 $m^3$/g, and 8.47 nm, respectively.

Example 23: Composite performance

The ZIF-8 and ZnMgAl hydroxide composite, the ZIF-8 and MnMgAl hydroxide composite, the ZIF-8 and CoMgAl hydroxide composite, and the ZIF-8 and CuMgAl hydroxide composite (0.1 g) were separately dispersed in 100 mL water (pH 7) via magnetic stirring (700 rpm). A sour gas stream containing $H_2S$ (100.3 ppm) in a mixture of carbon dioxide (4992 ppm) and nitrogen (balance) was introduced to the continuously stirred tank reactor (CSTR) at a flow rate of 80 mL/min. The reactor volume was 150 mL. The gas exiting the reactor was sent to an $H_2S$ gas detector with a detection limit of 0.5 ppm. The exit gas was monitored and the concentration of $H_2S$ in the treated gas was continuously recorded. The experiments were conducted at ambient conditions (room temperature and atmospheric pressure).

Figure 14:
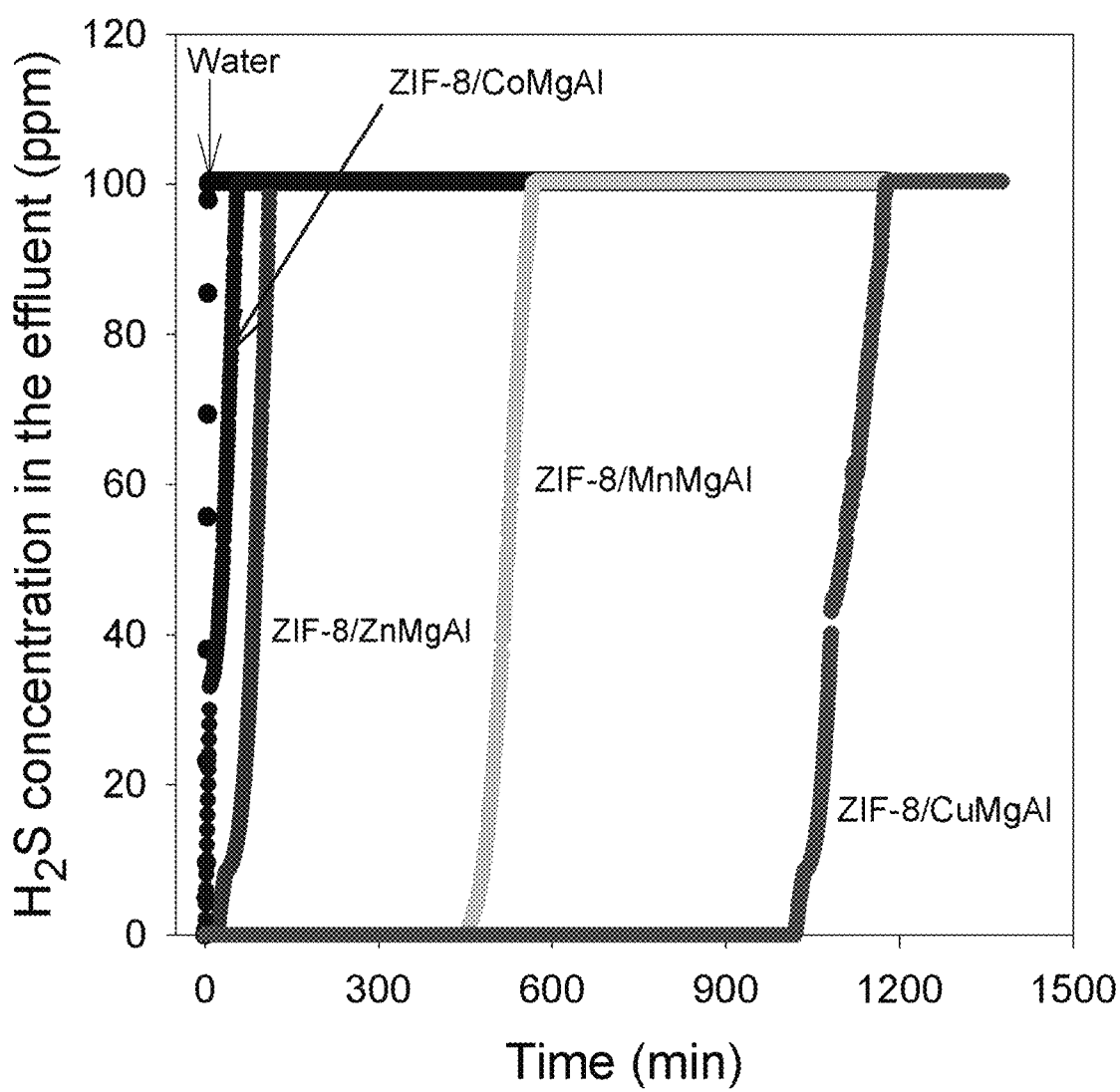
FIG. 14 illustrates a breakthrough curve of the composites, according to certain embodiments.

FIG. 14 shows the breakthrough curve obtained using the ZIF-8 and ZnMgAl hydroxide composite, the ZIF-8 and MnMgAl hydroxide composite, the ZIF-8 and CoMgAl hydroxide composite, and the ZIF-8 and CuMgAl hydroxide composite under the above conditions in the CSTR. A control example of a catalyst free system including only water is also shown in FIG. 14. The breakthrough time, saturation time, and the $H_2S$ scavenging capacities at the breakthrough and the saturation times for each composite are summarized in Table 1.

TABLE 1

Composite performance

| Composite | Breakthrough time (min) | Amount of $H_2S$ captured at breakthrough time (mg $H_2S$/g composite) | Saturation time (min) | Amount of $H_2S$ captured at saturation time (mg $H_2S$/g composite) |
| --- | --- | --- | --- | --- |
| ZIF-8/ZnMgAl | 21.5 | 2.45 | 116 | 9.24 |
| ZIF-8/CoMgAl | 1 | 0.17 | 62 | 3.04 |
| ZIF-8/MnMgAl | 453 | 50.60 | 573 | 58.01 |
| ZIF-8/CuMgAl | 1020 | 113.92 | 1184 | 123.21 |

It is also noteworthy to mention that the composite loading can be adjusted depending on the $H_2S$ concentration in the $H_2S$-containing gas composition as well as the sour gases flow rate. The loading of the composite can be high such that it can form a thick reaction slurry (i.e., slurry phase reaction). Additionally, the stirring speed, medium pH, volume, reaction temperature, pressure, and gas inlet flow rate can be adjusted to meet the reactor configurations and design parameters.

Example 24: Application in Sour Oil Desulfurization

Sour oil can also be treated by the method described in the present disclosure. Firstly, the sour oil is emulsified in water to form an emulsion. Then, the composite is mixed and suspended in the emulsion. Additionally, the contact between the sulfur-bearing components of the sour oil in the emulsion and the composite promote the desulfurization of sour oil.

Numerous modifications and variations of the present disclosure are possible in light of the above teachings. It is therefore to be understood that within the scope of the appended claims, the invention may be practiced otherwise than as specifically described herein.

The invention claimed is:

1. A method for removing hydrogen sulfide ($H_2S$) from a $H_2S$-containing gas composition, comprising:
   adding an aqueous media to a reactor under continuous agitation;
   dispersing particles of a composite in the aqueous media to form a composite mixture;
   continuously agitating the composite mixture;
   introducing the $H_2S$-containing gas composition to the reactor containing the composite mixture under continuous agitation and passing the $H_2S$-containing gas composition through the composite mixture; and
   adsorbing and removing $H_2S$ from the gas composition by the composite mixture to form a purified gas composition,
   wherein the composite comprises:
      a XMgAl mixed hydroxide, where X is Zn, Co, Mn, or Cu; and
      a zeolitic imidazolate framework-8 (ZIF-8),
   wherein particles of the XMgAl mixed hydroxide are dispersed within pores of the ZIF-8, and
   wherein the composite is made by a method comprising:
      preparing the ZIF-8; and
      hydrothermally reacting the ZIF-8 with metal salts of metals in the XMgAl mixed hydroxide to form the composite,
   wherein the ZIF-8 has a specific pore volume of 0.3-0.7 $m^3/g$, and a pore size of 0.5-5 nm.

2. The method of claim 1, wherein the XMgAl mixed hydroxide has a molar ratio of X to Mg to Al of 1-10 to 1-10 to 1-10.

3. The method of claim 1, wherein the XMgAl mixed hydroxide has a molar ratio of X to Mg to Al of 10 to 1 to 3.67.

4. The method of claim 1, wherein the composite comprises 30-70 wt. % of the XMgAl mixed hydroxide and 30-70 wt. % of the ZIF-8, based on a total weight of the composite.

5. The method of claim 1, wherein particles of the ZIF-8 have an average size of 0.1-10 μm.

6. The method of claim 1, wherein the ZIF-8 has a Langmuir specific surface area of 1300-1700 $m^2/g$, and a BET specific surface area of 1100-1300 $m^2/g$.

7. The method of claim 1, wherein the particles of the XMgAl mixed hydroxide are further dispersed on a surface of the ZIF-8.

8. The method of claim 1, wherein the gas composition further comprises at least one of methane, carbon dioxide, and nitrogen, and
   wherein the composite selectively adsorbs the $H_2S$.

9. The method of claim 1, wherein the $H_2S$ is present in the gas composition at a concentration in a range of 10 to 200 parts per million by volume (ppmv) based on a total volume of the gas composition.

10. The method of claim 1, wherein the $H_2S$-containing gas composition is introduced to the reactor at a rate of 0.4 to 2.0 milliliters per minute (mL/min) per milligram of the composite.

11. The method of claim 1, wherein the composite is present in the liquid at a concentration in a range of from 0.5 to 2 milligrams per milliliter (mg/mL).

12. The method of claim 1, wherein the XMgAl mixed hydroxide is a CuMgAl mixed hydroxide.

13. The method of claim 12, wherein the composite is present in the aqueous media at a concentration of 1 mg/mL,
   wherein the composite is in contact with the gas composition comprising 100 ppmv of $H_2S$ at a rate of 80 mL/min in the stirred tank reactor, and
   wherein the composite has a breakthrough time of from 15-20 hours, and a saturation time of from 18-22 hours.

14. The method of claim 13, wherein the composite has a scavenging capacity of 100-150 mg of hydrogen sulfide per gram of composite in the reactor.

15. A method for removing hydrogen sulfide ($H_2S$) from a $H_2S$-containing gas composition, comprising:
   adding an aqueous media to a reactor under continuous agitation;
   dispersing particles of a composite in the aqueous media to form a composite mixture;
   continuously agitating the composite mixture;
   introducing the $H_2S$-containing gas composition to the reactor containing the composite mixture under continuous agitation and passing the $H_2S$-containing gas composition through the composite mixture; and
   adsorbing and removing $H_2S$ from the gas composition by the composite mixture to form a purified gas composition,
   wherein the composite comprises:
      a XMgAl mixed hydroxide, where X is Zn, Co, Mn, or Cu; and
      a zeolitic imidazolate framework-8 (ZIF-8),
   wherein particles of the XMgAl mixed hydroxide are dispersed within pores of the ZIF-8, and
   wherein the composite is made by a method comprising:
      preparing the ZIF-8; and
      hydrothermally reacting the ZIF-8 with metal salts of metals in the XMgAl mixed hydroxide to form the composite,
   wherein the composite has a Langmuir specific surface area of 20-60 $m^2/g$.

16. A method for removing hydrogen sulfide ($H_2S$) from a $H_2S$-containing gas composition, comprising:
   adding an aqueous media to a reactor under continuous agitation;
   dispersing particles of a composite in the aqueous media to form a composite mixture;
   continuously agitating the composite mixture;
   introducing the $H_2S$-containing gas composition to the reactor containing the composite mixture under continuous agitation and passing the $H_2S$-containing gas composition through the composite mixture; and adsorbing and removing $H_2S$ from the gas composition by the composite mixture to form a purified gas composition, wherein the composite comprises:
  a XMgAl mixed hydroxide, where X is Zn, Co, Mn, or Cu; and
  a zeolitic imidazolate framework-8 (ZIF-8), wherein particles of the XMgAl mixed hydroxide are dispersed within pores of the ZIF-8, and wherein the composite is made by a method comprising:
  preparing the ZIF-8; and
  hydrothermally reacting the ZIF-8 with metal salts of metals in the XMgAl mixed hydroxide to form the composite, wherein the composite has a BET specific surface area of 10-45 $m^2/g$.

* * * * *